US012811743B2

(12) United States Patent
Abdelghaffar et al.

(10) Patent No.: US 12,811,743 B2
(45) Date of Patent: Nov. 24, 2026

(54) DEMODULATION REFERENCE SIGNAL BUNDLING IN SUB-BAND FULL-DUPLEX SLOTS

(71) Applicant: QUALCOMM Incorporated, San Diego, CA (US)

(72) Inventors: Muhammad Sayed Khairy Abdelghaffar, San Jose, CA (US); Diana Maamari, San Diego, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 336 days.

(21) Appl. No.: 18/599,079

(22) Filed: Mar. 7, 2024

(65) Prior Publication Data

US 2025/0286678 A1 Sep. 11, 2025

(51) Int. Cl.

*H04W 72/00* (2023.01)
*H04L 5/00* (2006.01)
*H04L 5/14* (2006.01)
*H04W 52/32* (2009.01)

(52) U.S. Cl.

CPC .......... *H04L 5/0051* (2013.01); *H04L 5/0064* (2013.01); *H04L 5/14* (2013.01)

(58) Field of Classification Search

None

See application file for complete search history.

(56) References Cited

U.S. PATENT DOCUMENTS

| | | | | |
|---|---|---|---|---|
| 12,207,281 | B2 * | 1/2025 | Sridharan | H04L 5/0012 |
| 2023/0292294 | A1 * | 9/2023 | Rudolf | H04W 72/0446 |
| 2024/0372661 | A1 * | 11/2024 | Park | H04L 5/0044 |
| 2025/0055658 | A1 * | 2/2025 | Chen | H04L 5/0094 |
| 2025/0056506 | A1 * | 2/2025 | Shim | H04L 1/08 |
| 2025/0159664 | A1 * | 5/2025 | Jiang | H04L 5/001 |
| 2025/0184109 | A1 * | 6/2025 | Fakoorian | H04L 27/2613 |
| 2026/0059501 | A1 * | 2/2026 | Zhang | H04W 72/0446 |

FOREIGN PATENT DOCUMENTS

WO WO-2025091391 A1 * 5/2025 ........... H04L 5/0094

* cited by examiner

*Primary Examiner* — Sithu Ko
(74) *Attorney, Agent, or Firm* — Harrity & Harrity, LLP

(57) ABSTRACT

Various aspects of the present disclosure generally relate to wireless communication. In some aspects, a user equipment (UE) may determine a nominal time domain window (TDW) for demodulation reference signal (DMRS) bundling across uplink transmissions in multiple slots. The UE may transmit the uplink transmissions with DMRS bundling split into multiple actual TDWs within the nominal TDW in connection with an event associated with a sub-band full duplex (SBFD) slot within the nominal TDW. Numerous other aspects are described.

20 Claims, 14 Drawing Sheets

DEMODULATION REFERENCE SIGNAL BUNDLING IN SUB-BAND FULL-DUPLEX SLOTS

FIELD OF THE DISCLOSURE

Aspects of the present disclosure generally relate to wireless communication and specifically relate to techniques, apparatuses, and methods for demodulation reference signal bundling in sub-band full-duplex slots.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

SUMMARY

Some aspects described herein relate to an apparatus for wireless communication at a user equipment (UE). The apparatus may include one or more memories and one or more processors coupled to the one or more memories. The one or more processors may be individually or collectively configured to cause the UE to determine a nominal time domain window (TDW) for demodulation reference signal (DMRS) bundling across uplink transmissions in multiple slots. The one or more processors may be individually or collectively configured to cause the UE to transmit the uplink transmissions with DMRS bundling split into multiple actual TDWs within the nominal TDW in connection with an event associated with a sub-band full duplex (SBFD) slot within the nominal TDW.

Some aspects described herein relate to a method of wireless communication performed at a UE. The method may include determining a nominal TDW for DMRS bundling across uplink transmissions in multiple slots. The method may include transmitting the uplink transmissions with DMRS bundling split into multiple actual TDWs within the nominal TDW in connection with an event associated with an SBFD slot within the nominal TDW.

Some aspects described herein relate to a non-transitory computer-readable medium that stores a set of instructions for wireless communication by a UE. The set of instructions, when executed by one or more processors of the UE, may cause the UE to determine a nominal TDW for DMRS bundling across uplink transmissions in multiple slots. The set of instructions, when executed by one or more processors of the UE, may cause the UE to transmit the uplink transmissions with DMRS bundling split into multiple actual TDWs within the nominal TDW in connection with an event associated with an SBFD slot within the nominal TDW.

Some aspects described herein relate to an apparatus for wireless communication. The apparatus may include means for determining a nominal TDW for DMRS bundling across uplink transmissions in multiple slots. The apparatus may include means for transmitting the uplink transmissions with DMRS bundling split into multiple actual TDWs within the nominal TDW in connection with an event associated with an SBFD slot within the nominal TDW.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

DETAILED DESCRIPTION

Figure 1:
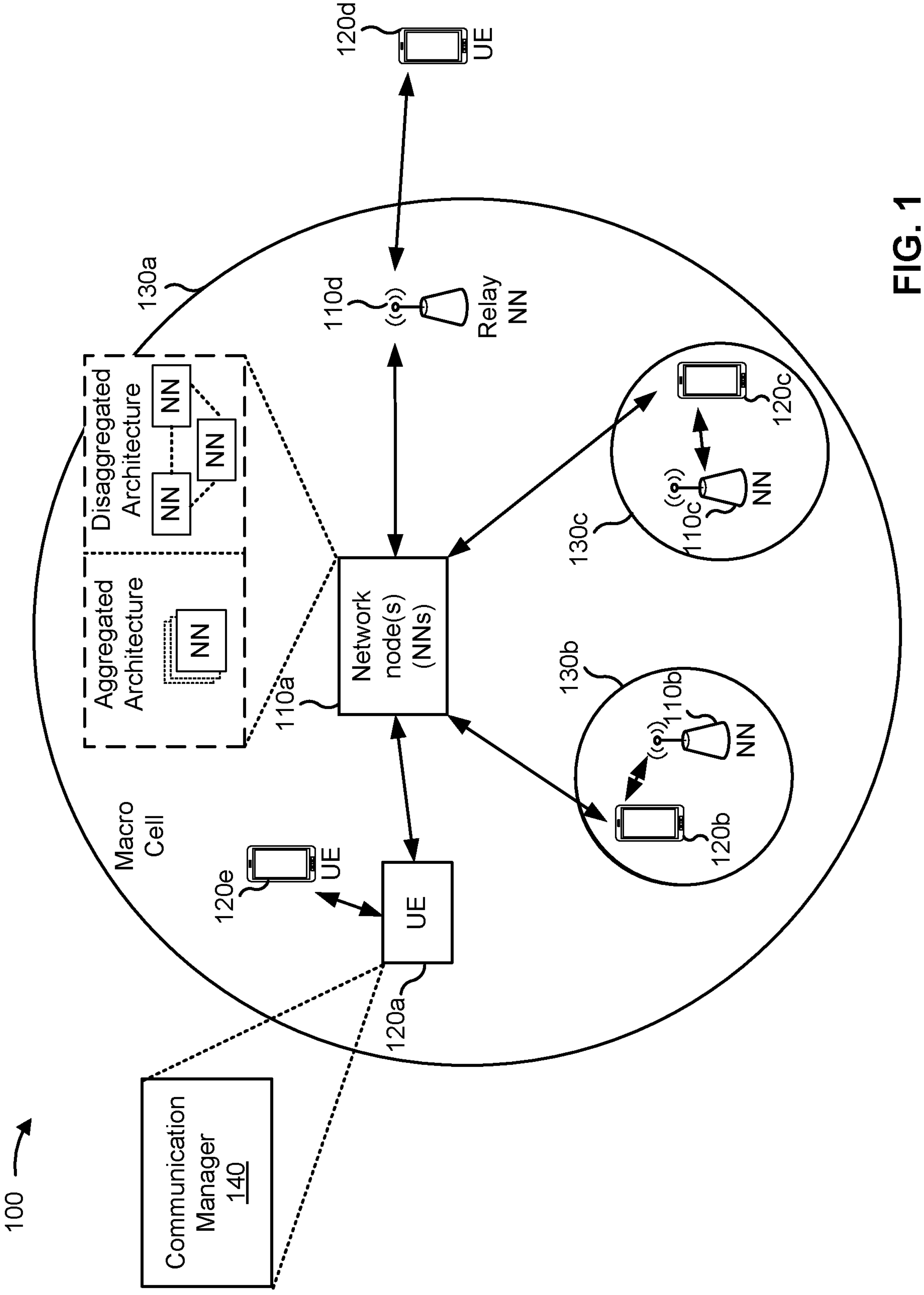
FIG. 1 is a diagram illustrating an example of a wireless communication network in accordance with the present disclosure.

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

"Full-duplex (FD) communication" in a wireless network refers to simultaneous bi-directional communication between devices in the wireless network. Sub-band full-duplex (SBFD) is a type of FD communication in which a network node may transmit a downlink communication and receive an uplink communication at the same time, but on different frequency resources. For example, the frequency resources used for downlink communication (e.g., a downlink sub-band) may be separated from the frequency resources used for uplink communication (e.g., an uplink sub-band), in the frequency domain, by a guard band. In some examples, an SBFD-aware user equipment (UE) (also referred to as an SBFD-capable UE or an SBFD UE) may be capable of half-duplex (HD) communication. For example, the UE may be capable of downlink reception in an SBFD symbol or uplink transmission in an SBFD symbol, but not simultaneous downlink reception and uplink reception in the same SBFD symbol. In such examples, the UE may have to determine whether to perform uplink transmission or downlink reception in SBFD symbols. For example, the UE may have to determine whether to perform uplink transmission or downlink reception in SBFD symbols in a case in which a time-domain collision between a scheduled uplink transmission and a scheduled downlink reception occurs in the SBFD symbols.

In some examples, time-domain collision handling rules may be established to specify whether a UE is to perform uplink transmission or downlink reception in SBFD symbols when there is a collision between a scheduled uplink transmission and a scheduled downlink reception. For example, the time-domain collision handling rules may specify a priority rule to resolve collisions between semi-statically scheduled uplink transmission and semi-statically scheduled downlink reception in SBFD symbols. In some examples, the time-domain collision rules may indicate that semi-statically scheduled downlink tracking reference signals (TRSs), synchronization signal blocks (SSBs), and/or physical downlink control channel (PDCCH) monitoring occasions may be prioritized over semi-statically scheduled uplink transmissions. In this case, a configured uplink transmission (or a scheduled uplink transmission occasion) may be dropped when the configured uplink transmission (or scheduled uplink transmission occasion) collides with a semi-statically scheduled TRS, SSB, and/or PDCCH monitoring occasion in SBFD symbols.

Demodulation reference signal (DMRS) bundling involves a UE performing coherent transmission, across multiple slots, of uplink channel transmissions (e.g., physical uplink shared channel (PUSCH) repetitions or physical uplink control channel (PUCCH) repetitions) including DMRSs. That is, the UE may perform DMRS bundling by maintaining phase coherence for uplink transmissions (and corresponding DMRSs included in the uplink transmissions) across multiple slots. DMRS bundling enables joint channel estimation (e.g., by a network node) across multiple slots. Such joint channel estimation may improve channel estimation, particularly for cell-edge UEs, which may increase traffic throughput.

In some examples, a nominal time domain window (TDW) duration for DMRS bundling may be configured for a UE (e.g., via configuration information received from a network node), and the UE may determine nominal TDWs for DMRS bundling based on the configured nominal TDW duration. In some cases, if DMRS bundling within a nominal TDW is interrupted by an event that leads to a phase change and/or a power change within the nominal TDW, the UE may split the nominal TDW into multiple actual TDWs and perform DMRS bundling separately within each actual TDW. In some examples, events that cause a UE to split a nominal TDW into multiple actual TDWs (e.g., to terminate one actual TDW and re-start another actual TDW) may include an intervening uplink transmission, a timing advance (TA) command, an intervening downlink measurement, monitoring, or reception, a change in resource block (RB allocation, a change in power or use of different power control parameters, a beam change, or a gap between uplink transmissions that satisfies a threshold. However, such events do not cover scenarios that may arise in SBFD slots. Accordingly, there may be confusion as to how a UE is to perform DMRS bundling in SBFD slots. For example, there may be confusion as to how a UE is to perform DMRS bundling in SBFD slots when applying the time-domain collision rules established for SBFD slots. This may prevent UEs from performing DMRS bundling in SBFD slots, which may result in decrease channel estimation accuracy and decreased traffic throughput.

Various aspects relate generally to DMRS bundling in SBFD slots. In some aspects, a UE may determine a nominal TDW for DMRS bundling across uplink transmissions in multiple slots. For example, the nominal TDW may include one or more SBFD slots. The UE may transmit the uplink transmissions in the multiple slots with DMRS bundling split into multiple actual TDWs within the TDW, in connection with an event associated with an SBFD slot within the nominal TDW. For example, the UE may split the nominal TDW into multiple actual TDWs in connection with detecting the event associated with the SBFD slot. In some examples, the event associated with the SBFD slot may be a collision, in the SBFD slot, between a scheduled uplink transmission and a scheduled downlink reception associated with a higher priority than the scheduled uplink transmission (e.g., in accordance with one or more time-domain collision rules for SBFD). For example, the scheduled downlink reception may include a PDCCH monitoring occasion, an SSB, or a TRS. In some examples, the event associated with the SBFD slot may be a switch to downlink reception in the SBFD slot. In some examples, the event associated with the SBFD slot may be a switch of the SBFD slot to a downlink slot (e.g., a downlink-only slot).

Particular aspects of the subject matter described in this disclosure can be implemented to realize one or more of the following potential advantages. In some examples, by transmitting the uplink transmissions with DMRS bundling split between multiple actual TDWs within the nominal TDW, in connection with the event associated with the SBFD slot within the nominal TDW, the described techniques can be used to enable DMRS bundling within SBFD slots and prevent confusion regarding how a UE is to perform DMRS bundling with SBFD slots. Such DMRS bundling in SBFD slots may result in improved channel estimation and increased traffic throughput for communications in the SBFD slots.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the 3GPP. 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

FIG. 1 is a diagram illustrating an example of a wireless communication network 100 in accordance with the present disclosure. The wireless communication network 100 may be or may include elements of a 5G (or NR) network or a 6G network, among other examples. The wireless communication network 100 may include multiple network nodes 110, shown as a network node (NN) 110*a*, a network node 110*b*, a network node 110*c*, and a network node 110*d*. The network nodes 110 may support communications with multiple UEs 120, shown as a UE 120*a*, a UE 120*b*, a UE 120*c*, a UE 120*d*, and a UE 120*e*.

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless networks 100 may be deployed in a given geographic area. Each wireless communication network 100 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHz), FR2 (24.25 GHz through 52.6 GHz), FR3 (7.125 GHz through 24.25 GHz), FR4a or FR4-1 (52.6 GHz through 71 GHz), FR4 (52.6 GHz through 114.25 GHz), and FR5 (114.25 GHz through 300 GHz). Although a portion of FR1 is greater than 6 GHz, FR1 is often referred to (interchangeably) as a "Sub-6 GHZ" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHz," if used herein, may broadly refer to frequencies that are less than 6 GHZ, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/LTE and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 110 may include one or more devices, components, or systems that enable communication between a UE 120 and one or more devices, components, or systems of the wireless communication network 100. A network node 110 may be, may include, or may also be referred to as an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node (having an aggregated architecture), meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. For example, a disaggregated network node may have a disaggregated architecture. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (CUs), one or more distributed units (DUs), and/or one or more radio units (RUs). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (iFFT), beamforming, physical random access channel (PRACH) extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single network node 110 may include a combination of one or more CUs, one or more DUs, and/or one or more RUs. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or an NTN network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110*a* may be a macro network node for a macro cell 130*a*, the network node 110*b* may be a pico network node for a pico cell 130*b*, and the network node 110*c* may be a femto network node for a femto cell 130*c*. Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel may be used to transmit downlink control information (DCI) (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more PDCCHs, and downlink data channels may include one or more physical downlink shared channels (PDSCHs). Uplink channels may similarly include one or more control channels and one or more data channels. An uplink control channel may be used to transmit uplink control information (UCI) (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more PUCCHs, and uplink data channels may include one or more PUSCHs. The downlink and the uplink may each include a set of resources on which the network node 110 and the UE 120 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a DCI configuration to the one or more UEs 120) and/or reconfigured, which means that a BWP can be adjusted in real-time (or near-real-time) based on changing network conditions in the wireless communication network 100 and/or based on the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

As described above, in some aspects, the wireless communication network 100 may be, may include, or may be included in, an IAB network. In an IAB network, at least one network node 110 is an anchor network node that communicates with a core network. An anchor network node 110 may also be referred to as an IAB donor (or "IAB-donor"). The anchor network node 110 may connect to the core network via a wired backhaul link. For example, an Ng interface of the anchor network node 110 may terminate at the core network. Additionally or alternatively, an anchor network node 110 may connect to one or more devices of the core network that provide a core access and mobility management function (AMF). An IAB network also generally includes multiple non-anchor network nodes 110, which may also be referred to as relay network nodes or simply as IAB nodes (or "IAB-nodes"). Each non-anchor network node 110 may communicate directly with the anchor network node 110 via a wireless backhaul link to access the core network, or may communicate indirectly with the anchor network node 110 via one or more other non-anchor network nodes 110 and associated wireless backhaul links that form a backhaul path to the core network. Some anchor network node 110 or other non-anchor network node 110 may also communicate directly with one or more UEs 120 via wireless access links that carry access traffic. In some examples, network resources for wireless communication (such as time resources, frequency resources, and/or spatial resources) may be shared between access links and backhaul links.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a "multi-hop network." In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. Additionally or alternatively, a UE 120 may be or may operate as a relay station that can relay transmissions to or from other UEs

120. A UE 120 that relays communications may be referred to as a UE relay or a relay UE, among other examples.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an XR device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 and/or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) UEs, evolved or enhanced machine-type communication (eMTC), UEs, further enhanced eMTC (feMTC) UEs, or enhanced feMTC (efeMTC) UEs, or further evolutions thereof, all of which may be simply referred to as "MTC UEs". An MTC UE may be, may include, or may be included in or coupled with a robot, an uncrewed aerial vehicle, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication network 100).

Some UEs 120 may be classified according to different categories in association with different complexities and/or different capabilities. UEs 120 in a first category may facilitate massive IoT in the wireless communication network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of URLLC, enhanced mobile broadband (eMBB), and/or precise positioning in the wireless communication network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between the capability and complexity of NB-IoT devices and/or eMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, two or more UEs 120 (for example, shown as UE 120*a* and UE 120*e*) may communicate directly with one another using sidelink communications (for example, without communicating by way of a network node 110 as an intermediary). As an example, the UE 120*a* may directly transmit data, control information, or other signaling as a sidelink communication to the UE 120*e*. This is in contrast to, for example, the UE 120*a* first transmitting data in an UL communication to a network node 110, which then transmits the data to the UE 120*e* in a DL communication. In various examples, the UEs 120 may transmit and receive sidelink communications using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 110 may schedule and/or allocate resources for sidelink communications between UEs 120 in the wireless communication network 100. In some other deployments and configurations, a UE 120 (instead of a network node 110) may perform, or collaborate or negotiate with one or more other UEs to perform, scheduling operations, resource selection operations, and/or other operations for sidelink communications.

In various examples, some of the network nodes 110 and the UEs 120 of the wireless communication network 100 may be configured for full-duplex operation in addition to half-duplex operation. A network node 110 or a UE 120 operating in a half-duplex mode may perform only one of transmission or reception during particular time resources, such as during particular slots, symbols, or other time periods. Half-duplex operation may involve time-division duplexing (TDD), in which DL transmissions of the network node 110 and UL transmissions of the UE 120 do not occur in the same time resources (that is, the transmissions do not overlap in time). In contrast, a network node 110 or a UE 120 operating in a full-duplex mode can transmit and receive communications concurrently (for example, in the same time resources). By operating in a full-duplex mode, network nodes 110 and/or UEs 120 may generally increase the capacity of the network and the radio access link. In some examples, full-duplex operation may involve frequency-division duplexing (FDD), in which DL transmissions of the network node 110 are performed in a first frequency band or on a first component carrier and transmissions of the UE 120 are performed in a second frequency band or on a second component carrier different than the first frequency band or the first component carrier, respectively. In some examples, full-duplex operation may be enabled for a UE 120 but not for a network node 110. For example, a UE 120 may simultaneously transmit an UL transmission to a first network node 110 and receive a DL transmission from a second network node 110 in the same time resources. In some other examples, full-duplex operation may be enabled for a network node 110 but not for a UE 120. For example, a network node 110 may simultaneously transmit a DL transmission to a first UE 120 and receive an UL transmission from a second UE 120 in the same time resources. In some other examples, full-duplex operation may be enabled for both a network node 110 and a UE 120.

In some examples, the UEs 120 and the network nodes 110 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some RATs may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT).

In some aspects, the UE 120 may include a communication manager 140. As described in more detail elsewhere herein, the communication manager 140 may determine a nominal TDW for DMRS bundling across uplink transmissions in multiple slots; and transmit the uplink transmissions with DMRS bundling split into multiple actual TDWs within the nominal TDW in connection with an event associated with an SBFD slot within the nominal TDW. Additionally, or alternatively, the communication manager 140 may perform one or more other operations described herein.

As indicated above, FIG. 1 is provided as an example. Other examples may differ from what is described with regard to FIG. 1.

Figure 2:
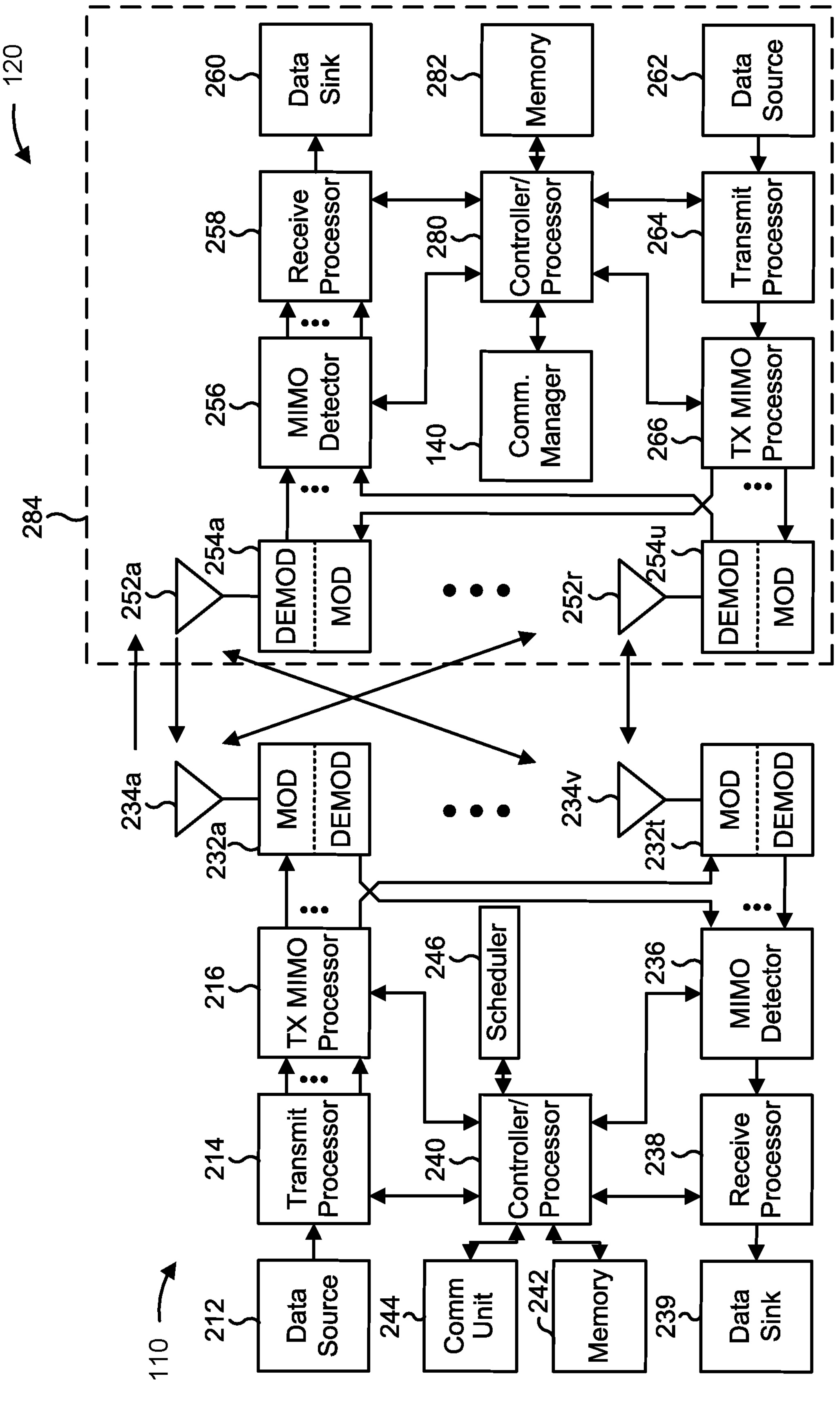
FIG. 2 is a diagram illustrating an example network node in communication with an example user equipment (UE) in a wireless network in accordance with the present disclosure.

FIG. 2 is a diagram illustrating an example network node 110 in communication with an example UE 120 in a wireless network in accordance with the present disclosure.

As shown in FIG. 2, the network node 110 may include a data source 212, a transmit processor 214, a transmit (TX) MIMO processor 216, a set of modems 232 (shown as 232*a* through 232*t*, where t≥1), a set of antennas 234 (shown as 234*a* through 234*v*, where v≥1), a MIMO detector 236, a receive processor 238, a data sink 239, a controller/processor 240, a memory 242, a communication unit 244, and/or a scheduler 246, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 110. The transceiver may be under control of and used by one or more processors, such as the controller/processor 240, and in some aspects in conjunction with processor-readable code stored in the memory 242, to perform aspects of the methods, processes, and/or operations described herein. In some aspects, the network node 110 may include one or more interfaces, communication components, and/or other components that facilitate communication with the UE 120 or another network node.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more)

processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

For downlink communication from the network node 110 to the UE 120, the transmit processor 214 may receive data ("downlink data") intended for the UE 120 (or a set of UEs that includes the UE 120) from the data source 212 (such as a data pipeline or a data queue). In some examples, the transmit processor 214 may select one or more MCSs for the UE 120 in accordance with one or more channel quality indicators (CQIs) received from the UE 120. The network node 110 may process the data (for example, including encoding the data) for transmission to the UE 120 on a downlink in accordance with the MCS(s) selected for the UE 120 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a DMRS, or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing (OFDM)) to obtain an output sample stream. Each modem 232 may further use the respective modulator component to process (for example, convert to analog, amplify, filter, and/or upconvert) the output sample stream to obtain a time domain downlink signal. The modems **232*a* through 232*t* may together transmit a set of downlink signals (for example, T downlink signals) via the corresponding set of antennas 234**.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 120 to the network node 110, uplink signals from the UE 120 may be received by an antenna 234, may be processed by a modem 232 (for example, a demodulator component, shown as DEMOD, of a modem 232), may be detected by the MIMO detector 236 (for example, a receive (RX) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 110 may use the scheduler 246 to schedule one or more UEs 120 for downlink or uplink communications. In some aspects, the scheduler 246 may use DCI to dynamically schedule DL transmissions to the UE 120 and/or UL transmissions from the UE 120. In some examples, the scheduler 246 may allocate recurring time domain resources and/or frequency domain resources that the UE 120 may use to transmit and/or receive communications using an RRC configuration (for example, a semi-static configuration), for example, to perform semi-persistent scheduling (SPS) or to configure a configured grant (CG) for the UE 120.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the network node 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 may include a set of antennas 252 (shown as antennas **252*a* through 252*r*, where r≥1), a set of modems 254 (shown as modems 254*a* through 254*u*, where u≥1), a MIMO detector 256, a receive processor 258, a data sink 260, a data source 262, a transmit processor 264, a TX MIMO processor 266, a controller/processor 280**, a memory 282, and/or a communication manager 140, among other examples. One or more of the components of the UE 120 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 120. The transceiver may be under control of and used by one or more processors, such as the controller/processor 280, and in some aspects in conjunction with processor-readable code stored in the memory 282, to perform aspects of the methods, processes, or operations described herein. In some aspects, the UE 120 may include another interface, another communication component, and/or another component that facilitates communication with the network node 110 and/or another UE 120.

For downlink communication from the network node 110 to the UE 120, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 to the data sink 260 (which may include a data pipeline, a data queue, and/or an application executed on the UE 120), and may provide decoded control information and system information to the controller/processor 280.

For uplink communication from the UE 120 to the network node 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 110 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 by the network node 110.

The transmit processor 264 may generate reference symbols for one or more reference signals, such as an uplink DMRS, an uplink sounding reference signal (SRS), and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254*a* through 254*u* may transmit a set of uplink signals (for example, R uplink signals or U uplink symbols) via the corresponding set of antennas 252. An uplink signal may include a UCI communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 120) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 120 or network nodes 110 may include different numbers of antenna elements. For example, a UE 120 may include a single antenna element, two antenna elements, four antenna elements, eight antenna elements, or a different number of antenna elements. As another example, a network node 110 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

Figure 3:
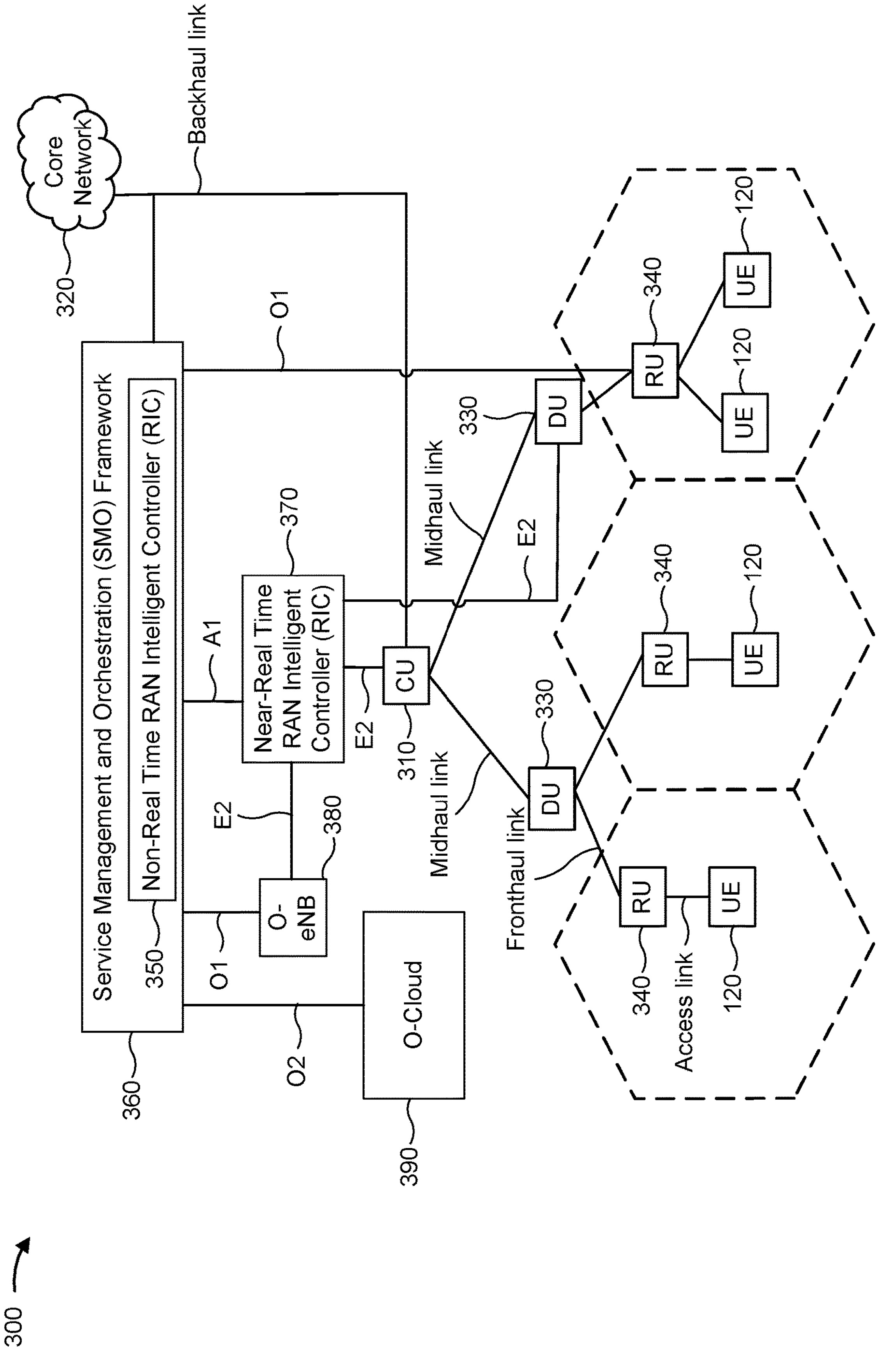
FIG. 3 is a diagram illustrating an example disaggregated base station architecture in accordance with the present disclosure.

FIG. 3 is a diagram illustrating an example disaggregated base station architecture 300 in accordance with the present disclosure. One or more components of the example disaggregated base station architecture 300 may be, may include, or may be included in one or more network nodes (such one or more network nodes 110). The disaggregated base station architecture 300 may include a CU 310 that can communicate directly with a core network 320 via a backhaul link, or that can communicate indirectly with the core network 320 via one or more disaggregated control units, such as a Non-RT RIC 350 associated with a Service Management and Orchestration (SMO) Framework 360 and/or a Near-RT RIC 370 (for example, via an E2 link). The CU 310 may communicate with one or more DUs 330 via respective midhaul links, such as via F1 interfaces. Each of the DUs 330 may communicate with one or more RUs 340 via respective fronthaul links. Each of the RUs 340 may communicate with one or more UEs 120 via respective RF access links. In some deployments, a UE 120 may be simultaneously served by multiple RUs 340.

Each of the components of the disaggregated base station architecture 300, including the CUs 310, the DUs 330, the RUs 340, the Near-RT RICs 370, the Non-RT RICs 350, and the SMO Framework 360, may include one or more interfaces or may be coupled with one or more interfaces for receiving or transmitting signals, such as data or information, via a wired or wireless transmission medium.

In some aspects, the CU 310 may be logically split into one or more CU user plane (CU-UP) units and one or more CU control plane (CU-CP) units. A CU-UP unit may communicate bidirectionally with a CU-CP unit via an interface, such as the E1 interface when implemented in an O-RAN configuration. The CU 310 may be deployed to communicate with one or more DUs 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 360 may support RAN deployment and provisioning of non-virtualized and virtualized network elements. For non-virtualized network elements, the SMO Framework 360 may support the deployment of dedicated physical resources for RAN coverage requirements, which may be managed via an operations and maintenance interface, such as an O1 interface. For virtualized network elements, the SMO Framework 360 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 350, and/or a Near-RT RIC 370. In some aspects, the SMO Framework 360 may communicate with a hardware aspect of a 4G RAN, a 5G NR RAN, and/or a 6G RAN, such as an open eNB (O-eNB) 380, via an O1 interface. Additionally or alternatively, the SMO Framework 360 may communicate directly with each of one or more RUs 340 via a respective O1 interface. In some deployments, this configuration can enable each DU 330 and the CU 310 to be implemented in a cloud-based RAN architecture, such as a vRAN architecture.

The Non-RT RIC 350 may include or may implement a logical function that enables non-real-time control and optimization of RAN elements and resources, AI/ML workflows including model training and updates, and/or policy-based guidance of applications and/or features in the Near-RT RIC 370. The Non-RT RIC 350 may be coupled to or may communicate with (such as via an A1 interface) the Near-RT RIC 370. The Near-RT RIC 370 may include or may implement a logical function that enables near-real-time control and optimization of RAN elements and resources via data collection and actions via an interface (such as via an E2 interface) connecting one or more CUs 310, one or more DUs 330, and/or an O-eNB with the Near-RT RIC 370.

In some aspects, to generate AI/ML models to be deployed in the Near-RT RIC 370, the Non-RT RIC 350 may receive parameters or external enrichment information from external servers. Such information may be utilized by the Near-RT RIC 370 and may be received at the SMO Framework 360 or the Non-RT RIC 350 from non-network data sources or from network functions. In some examples, the Non-RT RIC 350 or the Near-RT RIC 370 may tune RAN behavior or performance. For example, the Non-RT RIC 350 may monitor long-term trends and patterns for performance and may employ AI/ML models to perform corrective actions via the SMO Framework 360 (such as reconfiguration via an O1 interface) or via creation of RAN management policies (such as A1 interface policies).

As indicated above, FIG. 3 is provided as an example. Other examples may differ from what is described with regard to FIG. 3.

The network node 110, the controller/processor 240 of the network node 110, the UE 120, the controller/processor 280 of the UE 120, the CU 310, the DU 330, the RU 340, or any other component(s) of FIG. 1, 2, or 3 may implement one or more techniques or perform one or more operations associated with DMRS bundling for SBFD slots, as described in more detail elsewhere herein. For example, the controller/processor 240 of the network node 110, the controller/processor 280 of the UE 120, any other component(s) of FIG. 2, the CU 310, the DU 330, or the RU 340 may perform or direct operations of, for example, process 900 of FIG. 9, or other processes as described herein (alone or in conjunction with one or more other processors). The memory 242 may store data and program codes for the network node 110, the network node 110, the CU 310, the DU 330, or the RU 340. The memory 282 may store data and program codes for the UE 120. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 110, the UE 120, the CU 310, the DU 330, or the RU 340, may cause the one or more processors to perform process 900 of FIG. 9, or other processes as described herein. In some examples, executing instructions may include running the instructions, converting the instructions, compiling the instructions, and/or interpreting the instructions, among other examples.

In some aspects, a UE (e.g., the UE 120) includes means for determining a nominal TDW for DMRS bundling across uplink transmissions in multiple slots; and/or means for transmitting the uplink transmissions with DMRS bundling split into multiple actual TDWs within the nominal TDW in connection with an event associated with an SBFD slot within the nominal TDW. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

As indicated above, FIG. 3 is provided as an example. Other examples may differ from what is described with regard to FIG. 3.

Figure 4:
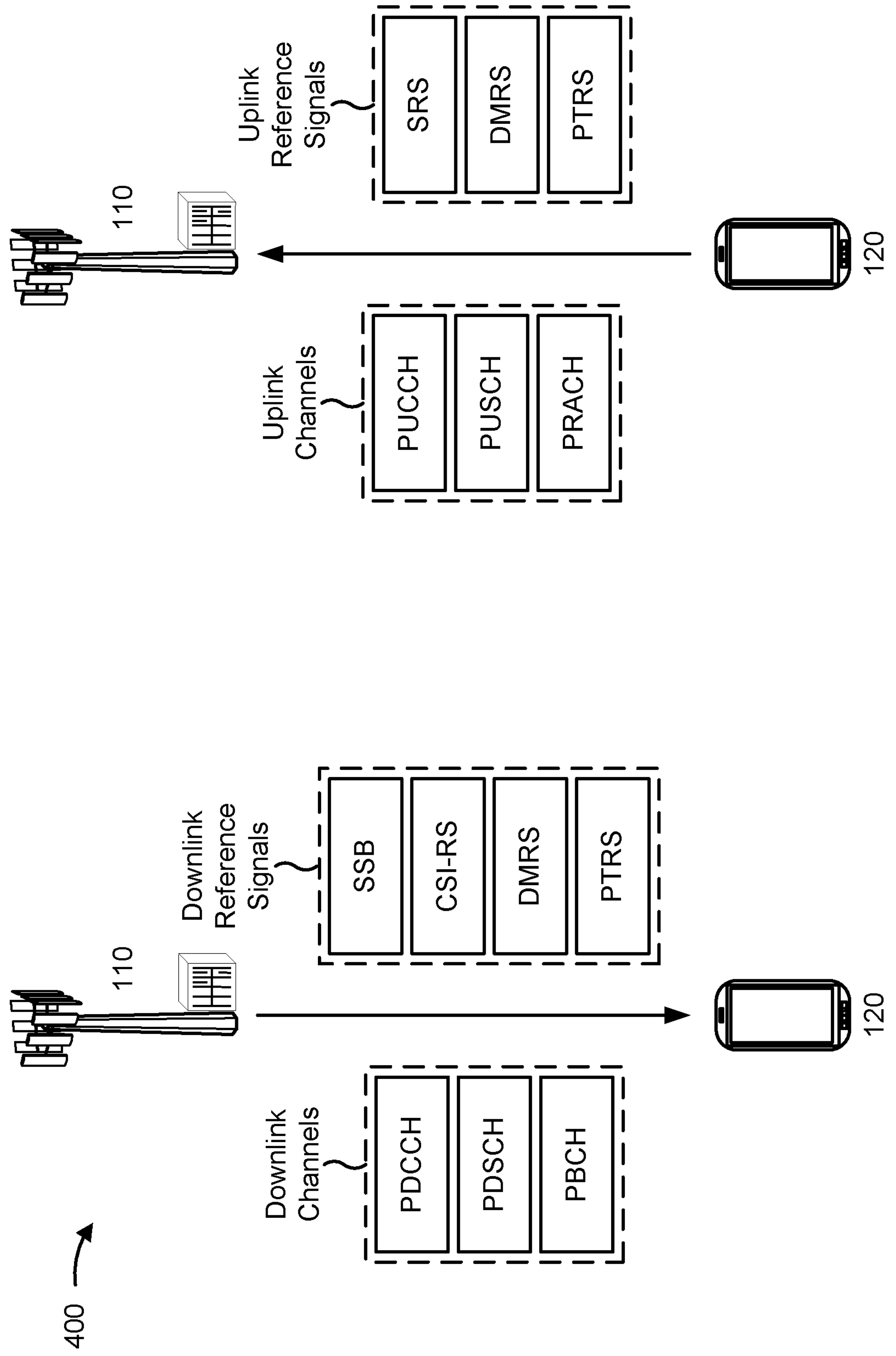
FIG. 4 is a diagram illustrating an example of physical channels and reference signals in a wireless network, in accordance with the present disclosure.

FIG. 4 is a diagram illustrating an example 400 of physical channels and reference signals in a wireless network, in accordance with the present disclosure. As shown in FIG. 4, downlink channels and downlink reference signals may carry information from a network node 110 to a UE 120, and uplink channels and uplink reference signals may carry information from a UE 120 to a network node 110.

As shown, a downlink channel may include a PDCCH that carries DCI, a PDSCH that carries downlink data, or a PBCH that carries system information, among other examples. In some examples, PDSCH communications may be scheduled by PDCCH communications. As further shown, an uplink channel may include a PUCCH that carries UCI, a PUSCH that carries uplink data, or a PRACH used for initial network access, among other examples. In some examples, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include an SSB, a CSI-RS, a DMRS, a PRS, or a phase tracking reference signal (PTRS), among other examples. As also shown, an uplink reference signal may include an SRS, a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some examples, the network node 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The network node 110 may configure a set of CSI-RSs for the UE 120, and the UE 120 may measure the configured set of CSI-RSs. Based at least in part on the measurements, the UE 120 may perform channel estimation and may report channel estimation parameters to the network node 110 (e.g., in a CSI report), such as a CQI, a precoding matrix indicator (PMI), a CSI-RS resource indicator (CRI), a layer indicator (LI), a rank indicator (RI), or an RSRP, among other examples. The network node 110 may use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the network node 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring network nodes in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the network node 110 may then calculate a position of the UE 120 based on the RSTD measurements reported by the UE 120.

An SRS may carry information used for uplink channel estimation, which may be used for scheduling, link adaptation, precoder selection, or beam management, among other examples. The network node 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The network node 110 may measure the SRSs, may perform channel estimation based at least in part on the measurements, and may use the SRS measurements to configure communications with the UE 120.

As indicated above, FIG. 4 is provided as an example. Other examples may differ from what is described with regard to FIG. 4.

Figure 5:
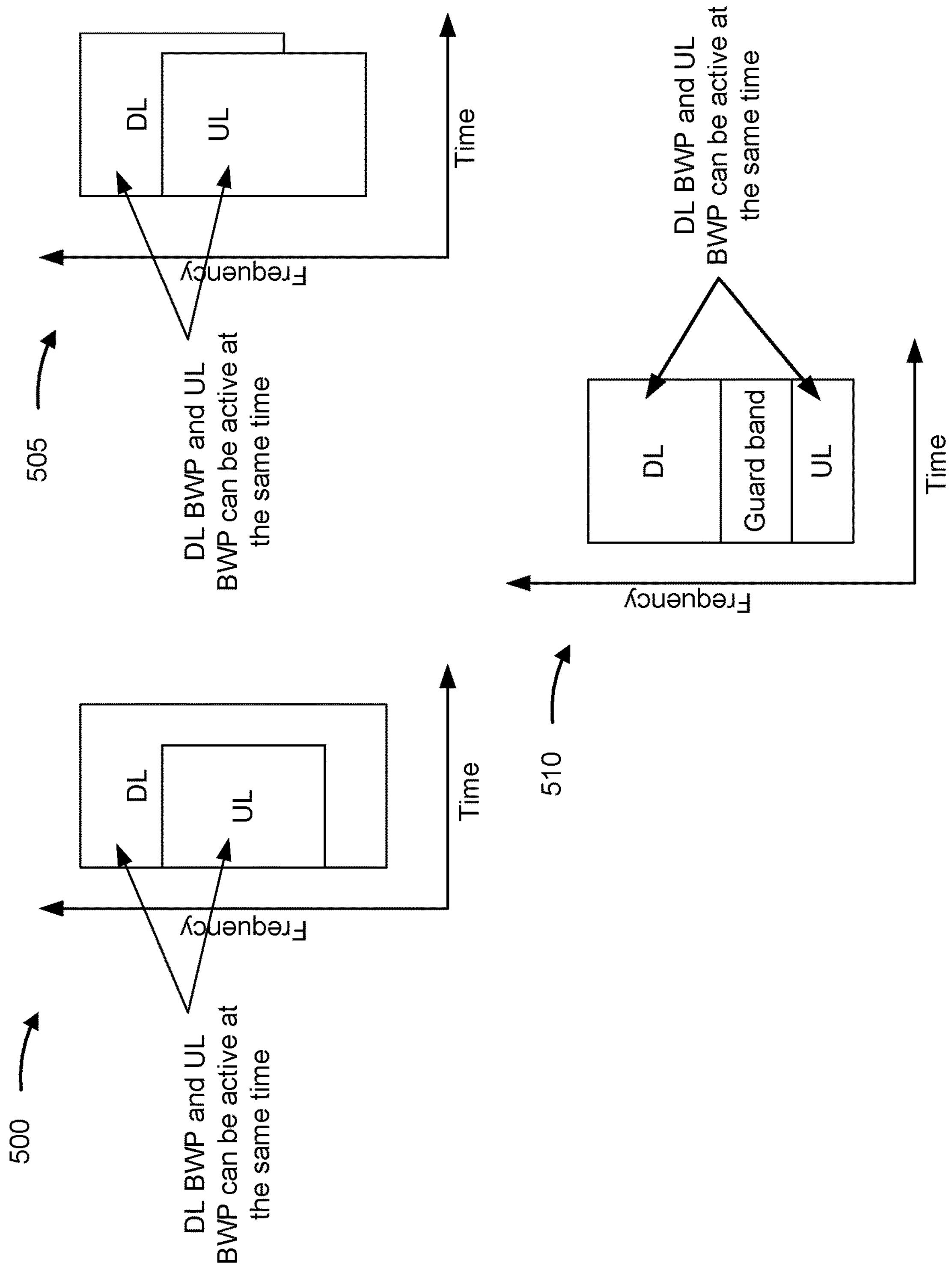
FIG. 5 is a diagram illustrating examples of full-duplex communication in a wireless network, in accordance with the present disclosure.

FIG. 5 is a diagram illustrating examples 500, 505, and 510 of FD communication in a wireless network, in accordance with the present disclosure. "Full-duplex communication" (or "FD communication") in a wireless network refers to simultaneous bi-directional communication between devices in the wireless network. For example, a UE operating in an FD mode may transmit an uplink communication and receive a downlink communication at the same time (for example, in the same slot or the same symbol). A network node operating in an FD mode may transmit a downlink communication and receive an uplink communication at the same time (for example, in the same slot or the same symbol). "Half-duplex communication" or "HD communication" in a wireless network refers to unidirectional communications (for example, only downlink communication or only uplink communication) between devices at a given time (for example, in a given slot or a given symbol).

As shown in FIG. 5, examples 500 and 505 show examples of in-band full-duplex (IBFD) communication. In IBFD, a UE may transmit an uplink communication to a base station and receive a downlink communication from the base station on the same time and frequency resources. As shown in example 500, in a first example of IBFD, the time and frequency resources for uplink communication may fully overlap with the time and frequency resources for downlink communication. As shown in example 505, in a second example of IBFD, the time and frequency resources for uplink communication may partially overlap with the time and frequency resources for downlink communication.

As further shown in FIG. 5, example 510 shows an example of SBFD communication, which may also be referred to as "sub-band frequency division duplex (SBFDD)" or "flexible duplex." In SBFD, a network node may transmit a downlink communication and receive an uplink communication at the same time, but on different frequency resources. For example, the different frequency resources may be sub-bands of a frequency band, such as a time division duplexing band. In such examples, the frequency resources used for downlink communication (for example, the downlink sub-band) may be separated from the frequency resources used for uplink communication (for example, the uplink sub-band), in the frequency domain, by a guard band.

As indicated above, FIG. 5 is provided as an example. Other examples may differ from what is described with respect to FIG. 5.

Figure 6:
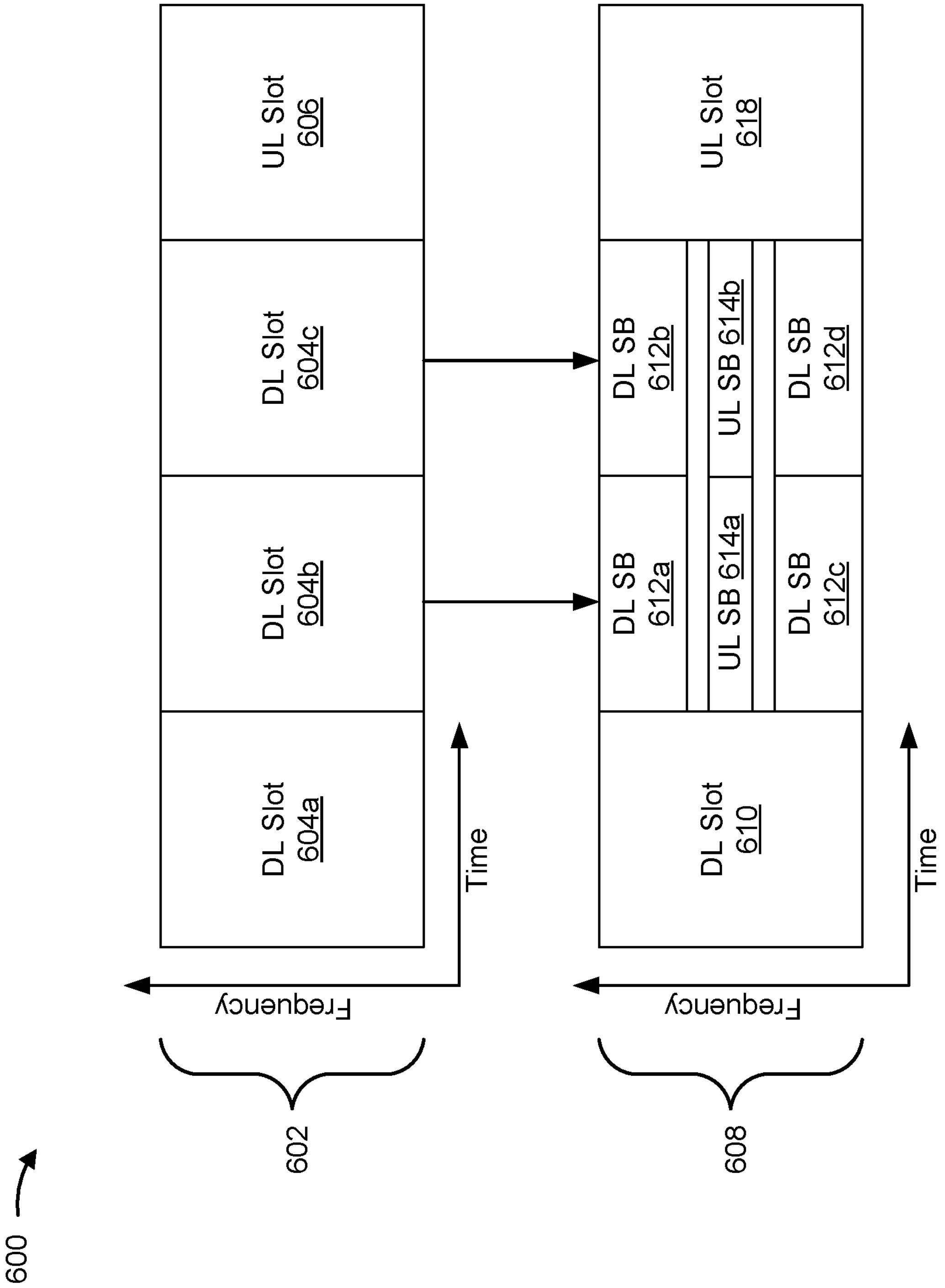
FIG. 6 is a diagram illustrating an example of sub-band full-duplex (SBFD) operation, in accordance with the present disclosure.

FIG. 6 is a diagram illustrating an example 600 of SBFD operation, in accordance with the present disclosure. As shown in FIG. 6, example 600 includes a first configuration 602. In some examples, the first configuration 602 may indicate a first slot format pattern (sometimes called a TDD pattern) associated with an HD mode or an FD mode. The first slot format pattern may include a quantity of downlink slots (for example, three downlink slots 604*a*, 604*b*, and 604*c*, as shown), a quantity of flexible slots (not shown), and/or a quantity of uplink slots (for example, one uplink slot 606, as shown). The first slot format pattern may repeat over time. In some examples, a network node (for example, network node 110) may indicate the first slot format pattern to a UE (for example, UE 120) using one or more slot format indicators. A slot format indicator, for a slot, may indicate whether that slot is an uplink slot, a downlink slot, or a flexible slot, among other examples.

A network node may instruct (for example, using an indication, such as an RRC message, a MAC-CE, DCI, or broadcast via SIB) a UE to switch from the first configuration 602 to a second configuration 608. As an alternative, the UE may indicate to the network node that the UE is switching from the first configuration 602 to the second configuration 608. The second configuration 608 may indicate a second slot format pattern that repeats over time, similar to the first slot format pattern. In any of the examples described above, the UE may switch from the first configuration 602 to the second configuration 608 during a time period (for example, a quantity of symbols and/or an amount of time (for example, in ms)) based on or otherwise associated with an indication received from the network node (for example, before switching back to the first configuration 602). During that time period, the UE may communicate using the second slot format pattern, and then may revert to using the first slot format pattern after the end of the time period. The time period may be indicated by the network node (for example, in the instruction to switch from the first configuration 602 to the second configuration 608, as described above) and/or based on or otherwise associated with a programmed and/or otherwise preconfigured rule. For example, the rule may be based on or otherwise associated with a table (for example, defined in 3GPP specifications and/or another wireless communication standard) that associates different sub-carrier spacings (SCSs) and/or numerologies (for example, represented by u and associated with corresponding SCSs) with corresponding time periods for switching configurations.

In example 600, the second slot format pattern includes a downlink slot 610, two SBFD slots in place of what were downlink slots in the first slot format pattern, and an uplink slot 618. In example 600, each SBFD slot includes at least one downlink sub-band (SB) (for example, DL SBs 612*a*, 612*b*, 612*c*, and 612*d*, as shown) and at least one uplink SB (for example, UL SBs 614*a* and 614*b*, as shown). Accordingly, the UE may operate using the second slot format pattern to transmit an uplink communication in an earlier slot (for example, the second slot in sequence, shown as partial UL slot 614*a*), as compared to using the first slot format pattern (for example, the fourth slot in sequence, shown as UL slot 606). Other examples may include additional or alternative changes. For example, the second configuration 608 may indicate an SBFD slot in place of what was an uplink slot in the first configuration 602 (for example, UL slot 606). In another example, the second configuration 608 may indicate a downlink slot or an uplink slot in place of what was an SBFD slot in the first configuration 602 (not shown in FIG. 6). In yet another example, the second configuration 608 may indicate a downlink slot or an uplink slot in place of what was an uplink slot or a downlink slot, respectively, in the first configuration 602.

"SBFD slot" may refer to a slot in which an SBFD format is used. An SBFD format may include a slot format in which full-duplex communication is supported (for example, for both uplink and downlink communications), with one or more frequencies used for an uplink SB of the slot being separated from one or more frequencies used for a downlink SB of the slot by a guard band. In some examples, the SBFD format may include a single uplink SB and a single downlink SB separated by a guard band. In some examples, the SBFD format may include multiple downlink SBs and a single uplink SB that is separated from the multiple downlink SBs by respective guard bands (for example, as shown in FIG. 6). In some examples, an SBFD format may include multiple uplink SBs and a single downlink SB that is separated from the multiple uplink SBs by respective guard bands. In some examples, the SBFD format may include multiple uplink SBs and multiple downlink SBs, where each uplink SB is separated from a downlink SB by a guard band. In some examples, operating using an SBFD mode may include activating or using an FD mode in one or more slots based on or otherwise associated with the one or more slots having the SBFD format. A slot may support the SBFD mode if an UL BWP and a DL BWP are permitted to be or are simultaneously active in the slot in an SBFD fashion (for example, with guard band separation). "SBFD symbol" may refer to a symbol (e.g., an OFDM symbol) in which an SBFD format is used. In some examples, SBFD operation may be activated at a slot level, and an SBFD symbol may be a symbol of an SBFD slot. In some examples, SBFD operation may be activated at a symbol level, and a slot may include one or more SBFD symbols and one or more non-SBFD symbols.

In some examples, an SBFD-aware UE may be an HD UE. That is, the UE may operate in an HD mode, while a network node operates in an FD mode. In such examples, the UE may have to determine whether to perform uplink transmission (Tx) or downlink reception (Rx) in SBFD symbols. In some examples, SBFD symbols may be treated as flexible symbols where the UE determines the traffic direction (e.g., downlink or uplink) based on dynamic scheduling (e.g., the UE monitors PDCCH candidates which may include DCI that schedules downlink reception or uplink transmission) or semi-static (e.g., RRC) signaling. Additionally, or alternatively, a default direction (e.g., downlink or uplink) for SBFD symbols may be semi-statically indicated to the UE by an RRC parameter. In some cases, time-domain collision between conflicting scheduled uplink transmissions and downlink receptions in SBFD symbols may occur. "Collision" may refer to a case in which at least one OFDM symbol (e.g., SBFD symbol) overlaps between a scheduled uplink transmission and a scheduled downlink reception for a UE, and/or a case in which a UE does not have sufficient time for Rx/TX switching between a scheduled downlink reception and a scheduled uplink transmission.

In some examples, time-domain collision rules may specify whether a UE is to perform uplink transmission or downlink reception in SBFD symbols when there is a collision between a scheduled uplink transmission and a scheduled downlink reception. For example, such time-domain collision rules may be specified in a wireless communication standard or configured (e.g., via RRC signaling) by a network node. In some examples, dynamically scheduled (e.g., via DCI) uplink transmission (e.g., SRS, PUCCH, and/or PUSCH) may be prioritized over semi-statically scheduled (e.g., periodic and/or semi-persistent) downlink reception (e.g., PDCCH, PDSCH, and/or CSI-RS). For example, when there is a collision between a semi-statically scheduled downlink reception and a dynamically scheduled uplink transmission, the semi-statically scheduled downlink reception may be canceled. In some examples, dynamically scheduled (e.g., via DCI) downlink reception (e.g., PDSCH and/or CSI-RS) may be prioritized over semi-statically scheduled (e.g., periodic and/or configured grant) uplink transmission (e.g., SRS, PUCCH, and/or PUSCH). In some examples, SSBs and Type0 common search space (CSS) downlink communications may be prioritized over dynamically scheduled and semi-statically scheduled uplink transmission. In some examples, a UE may not expect a collision between dynamically scheduled uplink transmission and dynamically scheduled downlink reception. In some examples, a priority rule may be specified (e.g., in a wireless communication standard) or configured (e.g., via RRC signaling by a network node) to resolve collisions between semi-statically scheduled uplink transmission and semi-statically scheduled downlink reception in SBFD symbols. For example, the priority rule may specify that the UE is to prioritize semi-statically scheduled uplink transmission (e.g., SRS, PUCCH, and/or PUSCH) over semi-statically scheduled downlink reception, except for PDCCH monitoring occasions (MOs) and TRSs. That is, a UE may prioritize semi-statically scheduled PDCCH MOs and TRSs over semi-statically scheduled uplink transmissions, but the UE may prioritize semi-statically scheduled uplink transmissions over other types of semi-statically scheduled downlink reception.

As indicated above, FIG. 6 is provided as an example. Other examples may differ from what is described with respect to FIG. 6.

Figure 7A:
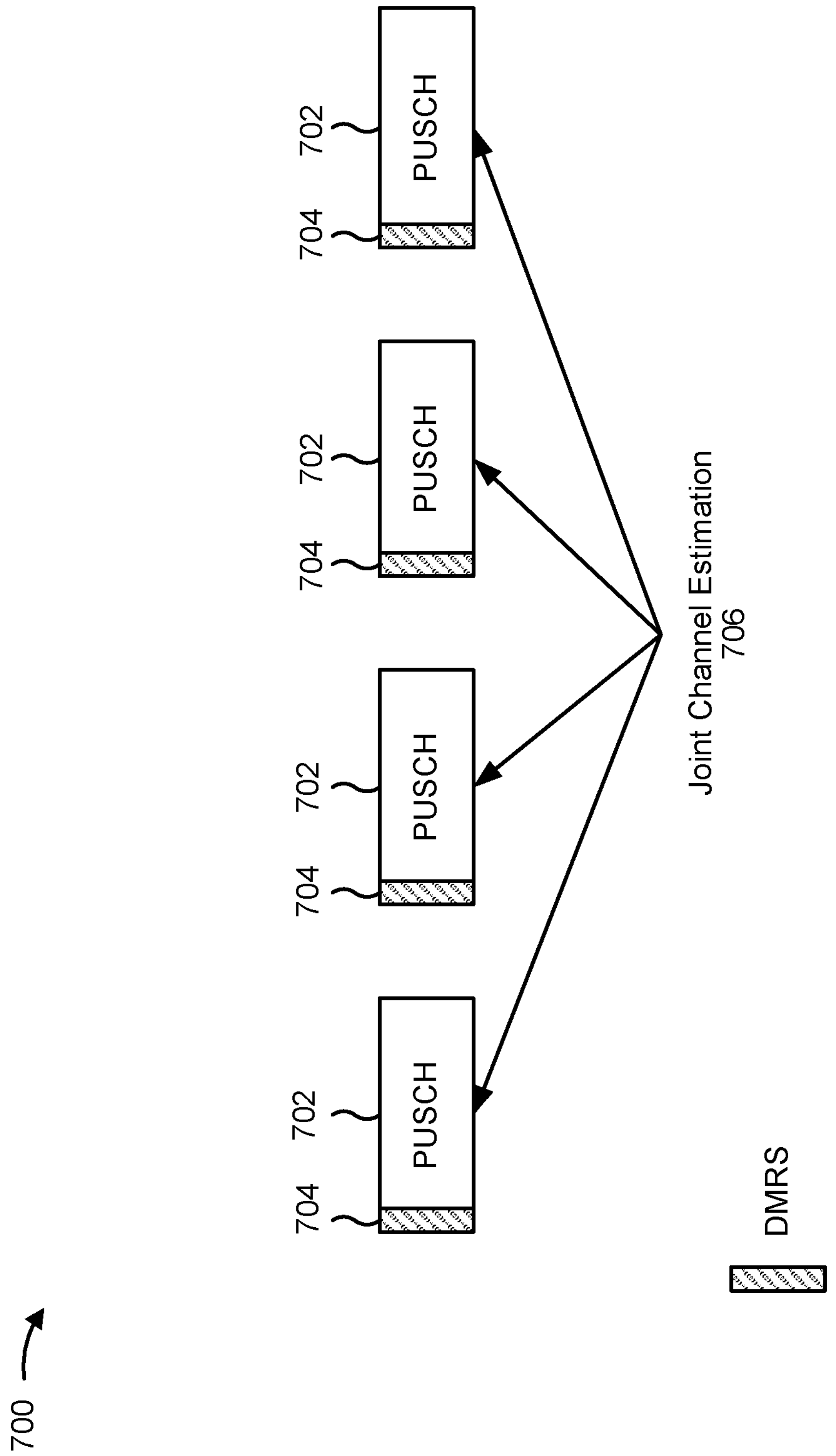
FIGS. 7A-7B are diagrams illustrating examples of demodulation reference signal (DMRS) bundling, in accordance with the present disclosure.
Figure 7B:
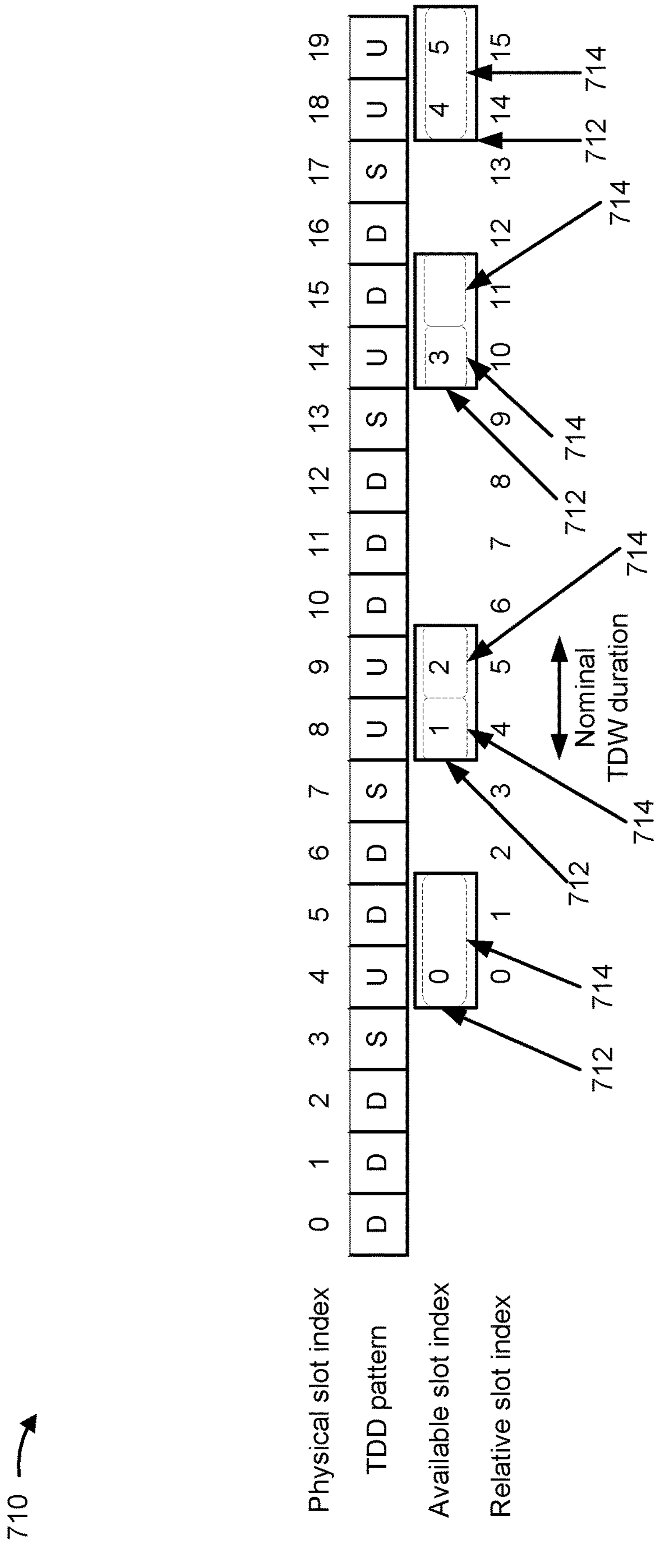

FIGS. 7A-7B are diagrams illustrating examples 700 and 710 of DMRS bundling, in accordance with the present disclosure.

DMRS bundling involves a UE (e.g., UE 120) performing coherent transmission, across multiple slots, of uplink channel transmissions including DMRSs. That is, the UE may perform DMRS bundling by maintaining phase coherence (e.g., the same phase) for uplink transmissions (and corresponding DMRSs included in the uplink transmissions) across multiple slots. As shown in FIG. 7A, in example 700, a UE may transmit PUSCH transmissions 702 across multiple slots with DMRS bundling. Each PUSCH transmission 702 may include a DMRS 704 (e.g., transmitted in a DMRS symbol). The UE may maintain phase coherency for the PUSCH transmissions 702 across the multiple slots, such that the DMRSs 704 have the same phase across the multiple slots. As shown by reference number 706, such DMRS bundling enables joint channel estimation (e.g., by a network node) across multiple slots. For example, a network node may receive the PUSCH transmission 702 including the DMRSs 704, and the network node may jointly process the DMRS symbols across the multiple slots to determine a channel estimation. Such joint channel estimation may improve channel estimation, particularly for cell-edge UEs, which may increase traffic throughput.

In some examples, DMRS bundling may be supported across PUSCH or PUCCH repetitions. For example, DMRS bundling may be supported for PUSCH transmissions of PUSCH repetition type A (e.g., scheduled by DCI format 0_1 or 0_2 or associated with a configured grant), PUSCH transmissions of PUSCH repetition type B, PUSCH transmissions associated with TB processing over multiple slots (TBOMS), or PUCCH transmissions of PUCCH repetition. In some examples, DMRS bundling may be applicable to long format PUCCH (e.g., PUCCH format 0 and PUCCH format 2 may be precluded from DMRS bundling). In some examples, DMRS bundling may not be permitted across different TBs. In some examples, DMRS bundling may be supported across a number of consecutive slots. In some examples, DMRS bundling across non-back-to-back PUSCH repetitions may be permitted. For example, DMRS bundling across such PUSCH repetitions may be permitted when a gap between transmissions of the PUSCH repetitions satisfies a threshold (e.g., the gap is less than 14 symbols, for normal cyclic prefix (CP)). If, between two PUSCH repetitions, an intervening uplink transmission by the UE occurs, or downlink monitoring or downlink reception by the UE is required, then phase continuity may be assumed to be broken and DMRS bundling across the PUSCH repetitions may no longer be possible or permitted. That is, the gap between the PUSCH repetitions may be required to be unoccupied in order for DMRS bundling across the PUSCH repetitions to be supported.

FIG. 7B shows an example 710 of DMRS bundling when available slot counting is enabled. Example 710 shows a TDD pattern for a set of slots. The TDD pattern may assign each slot as a downlink ("D") slot, an uplink ("U") slot, or a special ("S") slot that includes a guard period for a UE to switch from downlink reception to uplink transmission. Each slot may be associated with a physical slot index. An available slot index is assigned to each available slot for uplink transmission (e.g., each U slot in FIG. 7B), and a relative slot index may be an index that is relative to a first available slot (e.g., slot 4 in FIG. 7B).

In some examples, in a scenario in which available slot counting is enabled, a DMRS bundling procedure can be performed in two stages. In a first stage, the UE may determine nominal DMRS bundles based on a configured nominal TDW duration. For example, the nominal TDW duration may be a number of slots (e.g., two slots in example 710) over which DMRS bundling may be performed for uplink transmissions. As shown in FIG. 7B, the UE may determine nominal TDWs 712 for DMRS bundling based on the configured nominal TDW duration. Each nominal TDW 712 may start from an available slot and span the nominal TDW duration (e.g., two slots in example 710) in the time domain. Each nominal TDW 712 defines a nominal DMRS bundle (e.g., the DMRSs in the uplink transmissions/repetitions within that nominal TDW 712). In a second stage, the UE may perform DMRS bundling within each nominal TDW 712. The UE may start DMRS bundling in an actual TDW 714 (e.g., a first actual TDW) that starts at a beginning of the nominal TDW 712. If the DMRS bundling gets interrupted by an event that leads to a phase and/or power change, the UE may terminate the actual TDW 714 (e.g., the first actual TDW) and re-start a new actual TDW 714 (e.g., a second actual TDW). Accordingly, as shown in slots 8 and 9 in FIG. 7B, the UE may split (or "break up") a nominal TDW 712 into multiple actual TDWs 714 in connection with an event that causes a phase and/or power change between uplink transmissions within the nominal TDW 712. In this case, the UE may perform DMRS bundling separately within each actual TDW 714.

In some examples, a UE may split a nominal TDW into multiple actual TDWs any time the UE encounters (or detects) an event that breaks phase continuity and/or power consistency for the uplink transmissions (e.g., PUSCH or PUCCH repetitions) in the nominal TDW. For example, events that cause a UE to split a nominal TDW into multiple actual TDWs (e.g., to terminate one actual TDW and re-start another actual TDW) may include an intervening uplink transmission, a TA command, an intervening downlink measurement, monitoring, or reception, a change in RB allocation, a change in power or use of different power control parameters, a beam change, or a gap between uplink transmissions (e.g., PUSCH or PUCCH repetitions) that satisfies a threshold (e.g., the gap exceeds 13 symbols for normal CP or the gap exceeds 11 symbols for extended CP). In some examples, for a half-duplex frequency division duplex (HD-FDD) RedCap UE, a gap between two consecutive uplink (e.g., PUSCH) transmissions that overlaps with any symbols of downlink reception or downlink monitoring may constitute an event that causes the UE to split a nominal TDW into multiple actual TDWs.

A semi-static event is an event that is caused by or scheduled in accordance with a semi-static configuration (e.g., a periodic SRS). For example, frequency hopping, a beam change in multiple TRP (mTRP) communication, and a power change in mTRP communication may be considered semi-static events. A UE may be expected to plan around a semi-static event. In some examples, the UE may split a nominal TDW into multiple actual TDWs (e.g., terminate one actual TDW and re-start DMRS bundling in another actual TDW) based on the occurrence of a semi-static event. For example, the UE may be mandated (e.g., by a wireless communication standard) to re-start DMRS bundling within a nominal TDW (e.g., in a second actual TDW) after terminating DMRS bundling (e.g., in a first actual TDW) due to the occurrence of a semi-static event. A dynamic event is an event caused or scheduled by a dynamic indication, such as DCI or a MAC-CE. In some examples, the UE may not be mandated to re-start DMRS bundling in a nominal TDW after terminating DMRS bundling due to the occurrence of a dynamic event.

As indicated above, FIGS. 7A-7B are provided as examples. Other examples may differ from what is described with respect to FIGS. 7A-7B.

Figure 8A:
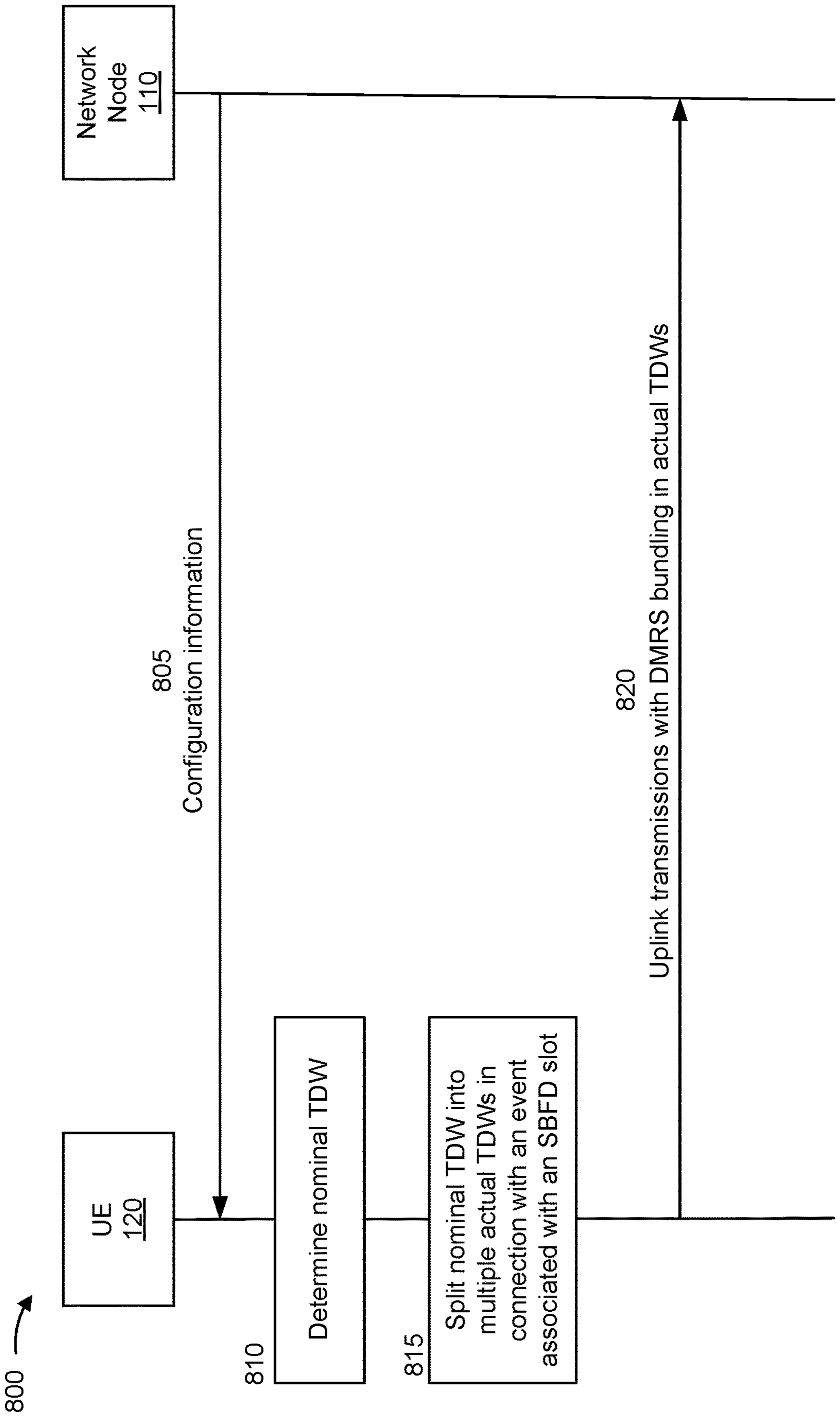
FIGS. 8A-8D are diagrams illustrating an example associated with DMRS bundling in SBFD slots, in accordance with the present disclosure.

FIGS. 8A-8D are diagrams illustrating an example 800 associated with DMRS bundling in SBFD slots, in accordance with the present disclosure. As shown in FIG. 8A, example 800 includes communication between a network node 110 and a UE 120. In some aspects, the network node 110 and the UE 120 may be included in a wireless communication network, such as wireless communication network 100. The network node 110 and the UE 120 may communicate via a wireless access link, which may include an uplink and a downlink. The UE 120 may be an SBFD-aware UE.

As shown in FIG. 8A, and by reference number 805, the network node 110 may transmit, and the UE 120 may receive, configuration information. In some aspects, the UE 120 may receive the configuration information via one or more of system information (e.g., a master information block (MIB) and/or a system information block (SIB), among other examples), RRC signaling, one or more MAC-CEs, and/or DCI, among other examples.

In some aspects, the configuration information may indicate one or more candidate configurations and/or communication parameters. In some aspects, the one or more candidate configurations and/or communication parameters may be selected, activated, and/or deactivated by a subsequent indication. For example, the subsequent indication may select a candidate configuration and/or communication parameter from the one or more candidate configurations and/or communication parameters. In some aspects, the subsequent indication may include a dynamic indication, such as one or more MAC-CEs and/or one or more DCI messages, among other examples.

In some aspects, the configuration information may indicate that the UE is to perform DMRS bundling. In some aspects, the configuration information may indicate a nominal TDW duration for DMRS bundling. For example, the nominal TDW duration may be a number of slots over which DMRS bundling may be performed for uplink transmissions.

In some aspects, the configuration information may indicate one or more time-domain collision rules for SBFD collisions. The time-domain collision rules may specify how the UE 120 is to prioritize uplink or downlink when there is a collision between scheduled uplink transmission and scheduled downlink reception in SBFD symbols. In some other aspects, all or a subset of the one or more time-domain collision rules for SBFD collisions may be pre-configured for the UE 120. For example, all or a subset of the one or more time-domain collision rules for SBFD collisions may be specified in a wireless communication standard.

In some aspects, the configuration information may configure and/or schedule downlink (e.g., periodic downlink reception and/or semi-persistent downlink reception) for the UE 120. "Downlink reception" may generally refer to downlink monitoring (e.g., PDCCH monitoring), downlink measurement (e.g., measurement of CSI-RSs and/or SSBs), and/or reception of downlink communications (e.g., PDSCH communications). Such downlink reception may be referred to as semi-statically configured downlink reception, semi-statically scheduled downlink reception, or semi-static downlink reception. For example, the semi-statically configured downlink reception may include periodic and/or semi-persistent PDCCH monitoring occasions, periodic and/or semi-persistent CSI-RSs, periodic and/or semi-static PDSCH communications, and SSBs (e.g., periodic SSBs). In some aspects, the configuration information may configure and/or schedule uplink transmission occasions (e.g., periodic uplink transmission occasions and/or configured grant uplink transmission occasions) for the UE 120. Such uplink transmission occasions may be referred to as semi-statically configured uplink transmission, semi-statically scheduled uplink transmission, or semi-static uplink transmission. For example, the semi-statically configured uplink transmission may include periodic SRSs, periodic and/or configured grant PUCCH transmission occasions, and/or periodic and/or configured grant PUSCH transmission occasions.

As further shown in FIG. 8A, and by reference number 810, the UE 120 may determine a nominal TDW for DMRS bundling. For example, the UE 120 may determine one or more nominal TDWs for DMRS bundling across uplink transmissions in multiple slots based at least in part on the nominal TDW duration indicated in the configuration information. The UE 120 may determine a nominal TDW starting at an available slot (e.g., an uplink slot or and SBFD slot) for transmitting an uplink transmission spanning the nominal TDW duration. In some aspects, the nominal TDW may include one or more SBFD slots. The nominal TDW may define a nominal DMRS bundle that includes the DMRSs in one or more uplink transmissions (e.g., PUSCH repetitions or PUCCH repetitions) scheduled within the nominal TDW. Accordingly, the UE 120 may define one or more nominal DMRS bundles by defining the one or more nominal TDW.

In some aspects, the nominal TDW may be for DMRS bundling across multiple uplink transmissions for which DMRS bundling is supported. For example, the uplink transmissions for which DMRS bundling is supported may include PUSCH transmissions of PUSCH repetition type A scheduled/activated by DCI (e.g., DCI format 0_1 or 0_2), PUSCH transmissions of PUSCH repetition type A associated with a configured grant, PUSCH transmissions of PUSCH repetition type B, PUSCH transmissions associated with TBOMS, and/or PUCCH transmissions of PUCCH repetition.

As further shown in FIG. 8A, and by reference number 815, the UE 120 may split the nominal TDW into multiple actual TDWs within the nominal TDW, in connection with an event associated with an SBFD slot within the nominal TDW. For example, the UE 120 may split the nominal TDW into multiple actual TDWs (e.g., the UE 120 may determine the multiple actual TDWs within the nominal TDW) in connection with detecting the event associated with an SBFD slot. As further shown in FIG. 8A, and by reference number 820, the UE 120 may transmit the uplink transmissions with DMRS bundling in the actual TDWs. That is, the UE 120 may transmit the uplink transmissions with DMRS bundling split into the multiple actual TDWs within the nominal TDW in connection with the event associated with the SBFD slot within the nominal TDW.

In some aspects, the UE 120 may start DMRS bundling in a first actual TDW starting at a start of the nominal TDW. The UE 120 may terminate the first actual TDW in connection with the event associated with the SBFD slot. The UE 120 may re-start DMRS bundling in a second actual TDW that starts after the event associated with the SBFD slot. In some aspects, the UE 120 may re-start the DMRS bundling in a second actual TDW that starts in a next slot (e.g., next SBFD slot or next uplink slot) after the SBFD slot in which the event associated with the SBFD slot occurs. In some other aspects, the UE 120 may re-start the DMRS bundling in a second actual TDW that starts in a slot that includes the next uplink transmission subsequent to the event associated with the SBFD slot.

In some aspects, the event associated with an SBFD slot may be an event, in an SBFD slot, that breaks phase continuity and/or power consistency for the uplink transmissions in the nominal TDW. For example, the event may cause power consistency and/or phase continuity not to be maintained across PUSCH transmissions of PUSCH repetition type A scheduled/activated by DCI, PUSCH transmissions of PUSCH repetition type A associated with a configured grant, PUSCH transmissions of PUSCH repetition type B, PUSCH transmissions associated with TBOMS, or PUCCH transmissions of PUCCH repetition within the nominal TDW. In some aspects, events that cause power consistency and/or phase continuity not to be maintained for the uplink transmissions within the nominal TDW may include: a collision, in an SBFD slot within the nominal TDW, between a scheduled uplink transmission and a scheduled downlink reception associated with a higher priority than the scheduled uplink transmission; a switch to downlink reception (e.g., downlink monitoring, measurement, or reception) in an SBFD slot within the nominal TDW; and/or a switch of an SBFD slot within the nominal TDW to a downlink slot (e.g., a downlink-only slot).

In some aspects, the event associated with an SBFD slot may be a collision, in an SBFD slot within the nominal TDW, between a scheduled uplink transmission and a scheduled downlink reception associated with a higher priority than the scheduled uplink transmission. For example, a collision, in an SBFD slot within the nominal TDW, between a scheduled uplink transmission and a scheduled downlink reception associated with a higher priority than the scheduled uplink transmission, may be considered to be an event that breaks phase continuity and/or power consistency for the uplink transmissions in the nominal TDW. In some examples, for PUSCH repetitions, such a collision may be considered an event that breaks phase continuity whether available slot counting (e.g., AvailableSlotCounting) is enabled or not. In some aspects, the relative priorities of the scheduled uplink transmission and the scheduled downlink reception that collide in the same SBFD symbols or slot may be based at least in part on a time-domain collision rule for SBFD collisions. In some examples, PDCCH monitoring occasions (e.g., semi-statically configured PDCCH monitoring occasions), TRSs (e.g., semi-statically configured TRSs), and/or SSBs may be prioritized over an uplink transmission (e.g., a semi-statically configured PUSCH or PUCCH transmission occasion). In this case, for SBFD-aware UEs, the collision of a PUSCH transmission occasion (or a PUCCH transmission occasion) may be considered an event that breaks phase continuity and/or power consistency for the uplink transmissions (e.g., PUSCH or PUCCH repetitions) in the nominal TDW. Additionally, or alternatively, reception of a PDSCH communication and/or a CSI-RS may be prioritized over an uplink transmission.

Figure 8B:
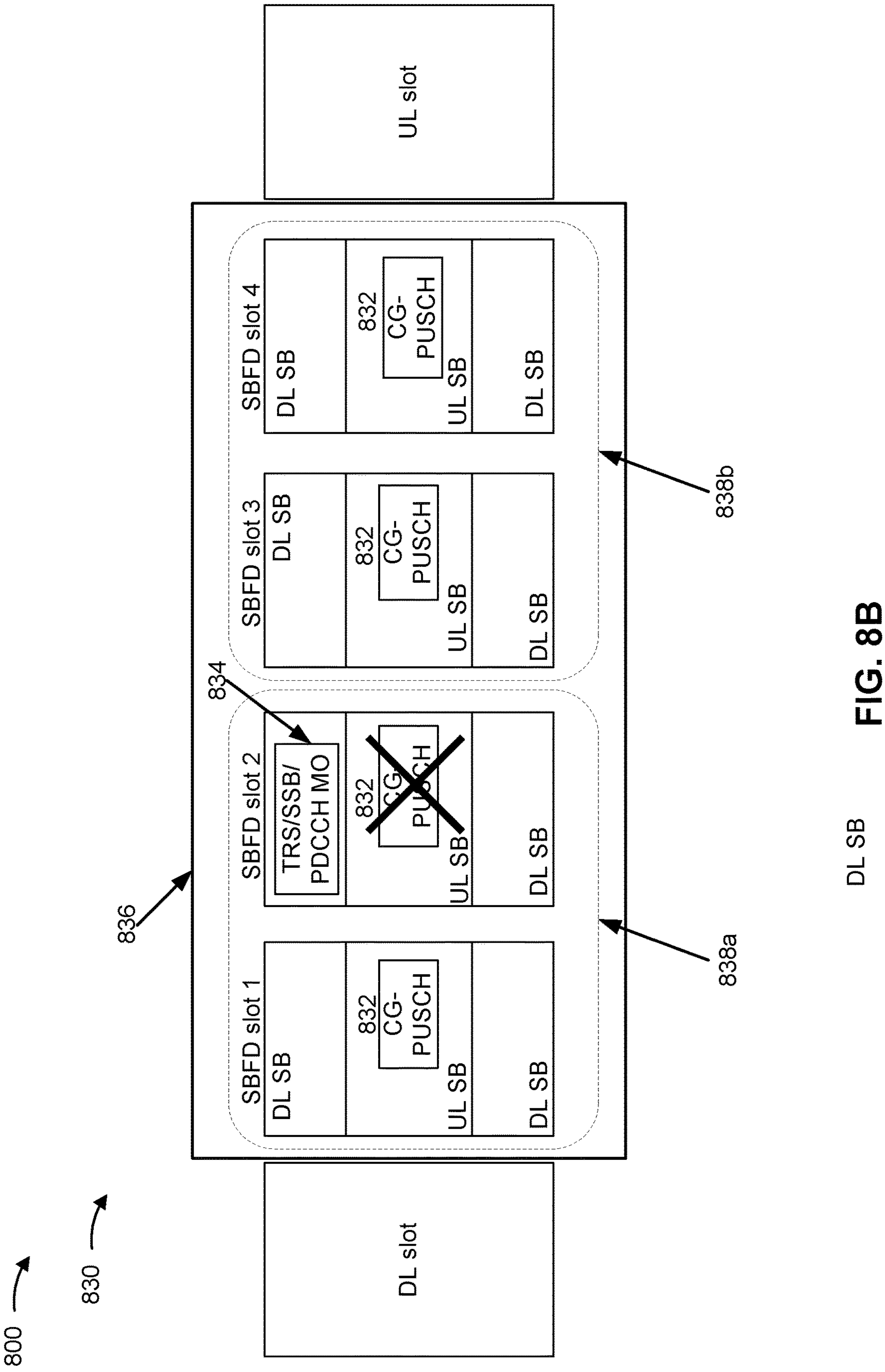

FIG. 8B shows an example 830 of DMRS bundling in a case in which there is a collision between a scheduled uplink transmission and a scheduled higher priority downlink reception in the same SBFD slot. As shown in FIG. 8B, and by reference number 832, configured grant PUSCH transmission occasions are scheduled in four SBFD slots (shown as SBFD slot 1-SBFD slot 4). As shown by reference number 834, there is a collision between a scheduled TRS, SSB, or PDCCH monitoring occasion and the scheduled configured grant PUSCH transmission occasion in SBFD slot 2. The scheduled TRS, SSB, or PDCCH monitoring occasion may be associated with a higher priority than the scheduled configured grant PUSCH transmission occasion (e.g., in accordance with a time-domain collision rule). Accordingly, the UE 120 may prioritize the scheduled TRS, SSB, or PDCCH monitoring occasion, and the UE 120 may drop the configured grant PDCCH transmission occasion in SBFD slot 2 (as shown by the “X” in FIG. 8B).

As further shown in FIG. 8B, the UE 120 may determine a nominal TDW 836. The nominal TDW 836 may start at SBFD slot 1 and may span the nominal TDW duration of four slots. Accordingly, the nominal TDW 836 may include the four SBFD slots. The collision of the scheduled TRS, SSB, or PDCCH monitoring occasion and the scheduled configured grant PUSCH transmission occasion in SBFD slot 2 and/or the dropping of the configured grant PUSCH transmission occasion due to the collision may be an event that causes the UE 120 to split the nominal TDW 836 into a first actual TDW 838*a* and a second actual TDW 838*b*. As shown in FIG. 8B, the UE 120 may terminate the first actual TDW 838*a* based on the collision of the scheduled TRS, SSB, or PDCCH with the scheduled configured grant PUSCH transmission occasion (and/or the dropping of the scheduled PUSCH transmission occasion) in SBFD slot 2. The UE 120 may re-start the second TDW 838*b* (e.g., the UE 120 may re-start DMRS bundling in the second TDW 838*b*) in a next slot (e.g., SBFD slot 3) after the SBFD slot in which the collision occurs.

In some aspects, all periodic TRSs (e.g., all periodic TRS occasions), all SSBs, and/or all PDCCH monitoring occasions may be associated with a higher priority than semi-statically configured or dynamically scheduled uplink transmissions. For example, a collision between a scheduled uplink transmission (e.g., a semi-statically configured or dynamically scheduled PUSCH transmission or PUCCH transmission) and any periodic TRS occasion, any SSB, and/or any PDCCH monitoring occasion in an SBFD slot within the nominal TDW may be an event that causes the UE 120 to split the nominal TDW into multiple actual TDWs. In some aspects, for TRSs, only the first two symbols in a TRS occasion (e.g., a first TRS slot) may be associated with a higher priority than the scheduled uplink transmission. In this case, a collision, in an SBFD slot in the nominal TDW, between the scheduled uplink transmission and the first two symbols in a TRS occasion may be an event that causes the UE 120 to split the nominal TDW into multiple actual TDWs. Additionally, or alternatively, in some aspects, for PDCCH monitoring occasions, only PDCCH monitoring occasions associated with a control resource set type 0 (CORESET0) or a CSS (e.g., Type0 CSS) may be associated with a higher priority than a scheduled uplink transmission. In this case, a collision, in an SBFD slot in the nominal TDW, between the scheduled uplink transmission and a PDCCH monitoring occasion associated with CORESET0 or the CSS may be an event that causes the UE 120 to split the nominal TDW into multiple actual TDWs. Additionally, or alternatively, in some aspects, for SSBs, the UE 120 may receive an indication (e.g., from the network node 110) to prioritize SSB reception for one or more SSBs (e.g., one or more protected SSBs). In this case, only the one or more protected SSBs may be associated with a higher priority than the scheduled uplink transmission, and a collision, in an SBFD slot in the nominal TDW, between the scheduled uplink transmission and a protected SSB may be an event that causes the UE 120 to split the nominal TDW into multiple actual TDWs.

In some aspects, in a case in which a semi-statically configured PDCCH monitoring occasion collides with a semi-statically scheduled uplink transmission (e.g., a configured grant PUSCH) in an SBFD slot, and the PDCCH monitoring occasion is associated with a higher priority than a scheduled uplink transmission, the UE 120 may receive, from the network node 110, a dynamic indication (e.g., via DCI or a MAC-CE) to skip the PDCCH monitoring occasion. In this case, the collision between the PDCCH monitoring occasion and the uplink transmission in the SBFD slot may not be considered an event that breaks phase continuity and/or power consistency if the dynamic indication to skip the PDCCH monitoring occasion is received by the UE 120 at a time offset prior to the scheduled uplink transmission that satisfies a threshold. For example, if the time offset between the dynamic indication to skip the PDCCH monitoring occasion and the scheduled uplink transmission exceeds the threshold, the UE 120 may have sufficient time to preparer the uplink transmission (e.g., PUSCH transmission) so that it may not be dropped. In some examples, the threshold for the time offset may be a function of, or otherwise based on, an N2 parameter or a Tproc,2 parameter. In a case in which the UE 120 receives the dynamic indication to skip the PDCCH monitoring occasion at a time offset prior to the scheduled uplink transmission that satisfies the threshold, the UE 120 may refrain from splitting the nominal TDW into multiple actual TDWs (e.g., due to the collision between the scheduled uplink transmission and the scheduled PDCCH monitoring occasion). In some aspects, if the offset between the indication to skip the PDCCH monitoring occasion and the scheduled uplink transmission does not satisfy the threshold (e.g., the PDCCH skipping is not indicated early enough prior to the scheduled uplink transmission), the UE 120 may not be mandated to re-start DMRS bundling (e.g., the UE 120 may not be expected to work around the dynamic event). That is, in a case in which the offset between the indication to skip the PDCCH monitoring occasion and the scheduled uplink transmission does not satisfy the threshold, the UE 120 may terminate a first actual TDW in the nominal TDW, but the UE 120 may not re-start DMRS bundling in a second actual TDW in the nominal TDW.

In some aspects, in one nominal TDW determined by the UE 120, a collision with a scheduled PDCCH monitoring occasion and a scheduled uplink transmission in an SBFD slot may be an event that causes the UE 120 to split the nominal TDW into multiple actual TDWs. However, in another nominal TDW (e.g., a subsequent nominal TDW) determined by the UE 120, the UE 120 may refrain from splitting the nominal TDW into multiple actual TDWs due to a collision between a PDCCH monitoring occasion and a scheduled uplink transmission, in connection with receiving the dynamic indication to skip the PDCCH monitoring occasion at time offset prior to the scheduled uplink transmission that satisfies the threshold.

In some aspects, the event associated with an SBFD slot may be a switch to downlink reception in an SBFD slot within the nominal TDW. For example, an intervening downlink reception (e.g., between two of the uplink transmissions in the nominal TDW) due to switching to downlink reception (e.g., switching from uplink to downlink) within an SBFD slot in the nominal TDW may be considered to be an event that breaks phase continuity and/or power consistency for the uplink transmissions in the nominal TDW. In this case, the intervening downlink reception may include downlink monitoring (e.g., a PDCCH monitoring occasion), downlink measurement (e.g., measurement of a CSI-RS or an SSB), and/or reception of a downlink communication (e.g., a PDSCH communication).

Figure 8C:
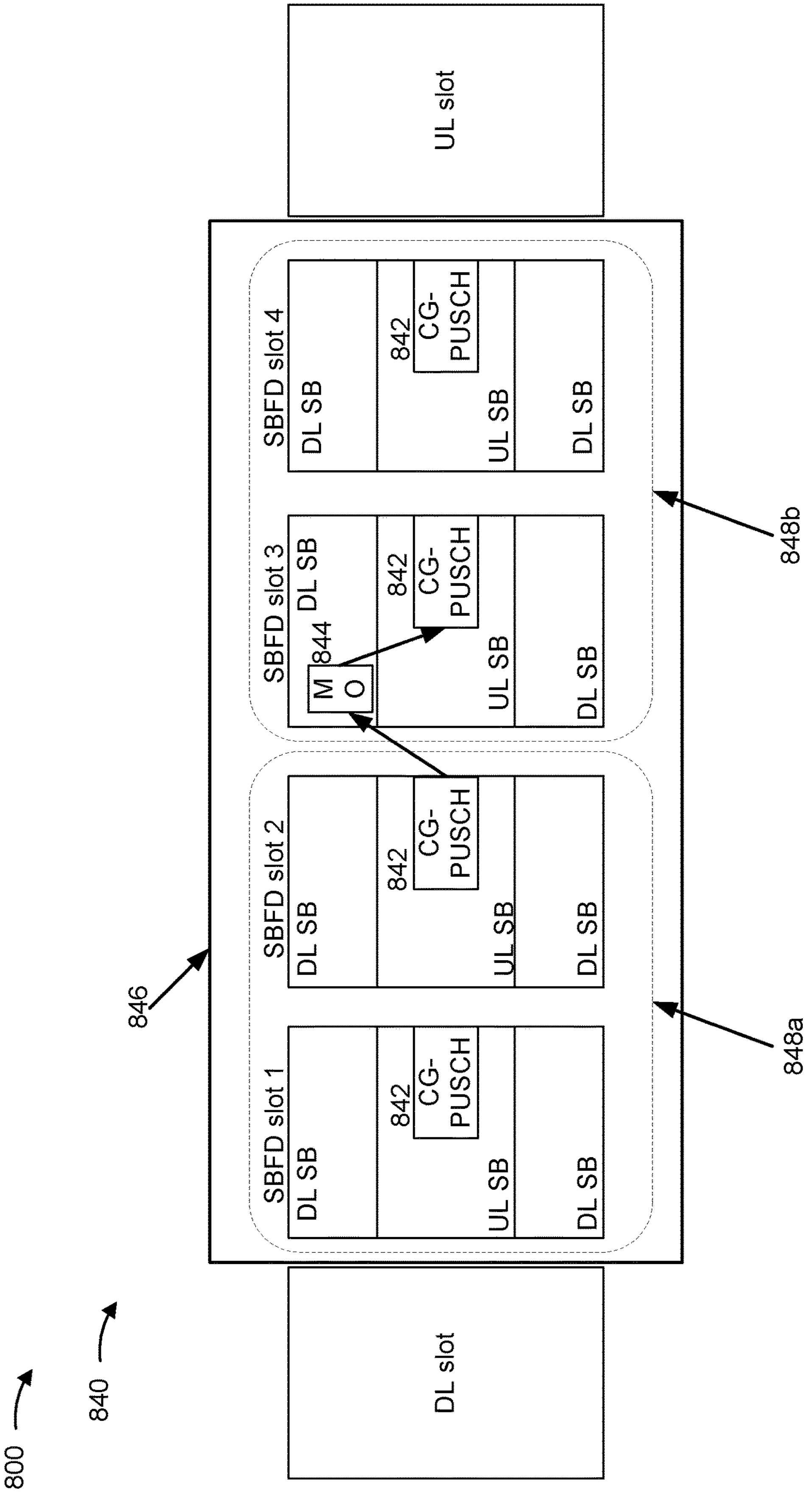

FIG. 8C shows an example 840 of DMRS bundling in a case in which there is a switch to downlink reception in an SBFD slot within the nominal TDW. As shown in FIG. 8C, and by reference number 842, configured grant PUSCH transmission occasions are scheduled in four SBFD slots (shown as SBFD slot 1-SBFD slot 4). As shown by reference number 844, there is a scheduled PDCCH monitoring occasion in SBFD slot 3, such that the UE 120 must switch from uplink transmission in SBFD slot 2 to downlink reception (e.g., downlink monitoring) in SBFD slot 3 and then switch back to uplink transmission in SBFD slot 3. As further shown in FIG. 8C, the UE 120 may determine a nominal TDW 846. The nominal TDW 846 may start at SBFD slot 1 and may span the nominal TDW duration of four slots. Accordingly, the nominal TDW 846 may include the four SBFD slots. The switch to downlink reception in SBFD slot 3 may be an event that causes the UE 120 to split the nominal TDW 846 into a first actual TDW 848*a* and a second actual TDW 848*b*. As shown in FIG. 8C, the UE 120 may terminate the first actual TDW 848*a* based on the switch to downlink reception in SBFD slot 3. In this example, the first actual TDW 848*a* may include SBFD slot 1 and SBFD slot 2. The UE 120 may re-start the second TDW 848*b* (e.g., the UE 120 may re-start DMRS bundling in the second TDW 848*b*) in a slot (e.g., SBFD slot 3) that includes the next scheduled configured grant PUSCH transmission occasion after the switch to downlink reception. In this example, the next configured grant after the switch to downlink reception is in the same slot (e.g., SBFD slot 3) as the switch to downlink reception. Accordingly, the second actual TDW 848*b* may include SBFD slot 3 and SBFD slot 4.

In some aspects, the event associated with an SBFD slot may be a switch of an SBFD slot within the nominal TDW to a downlink slot (e.g., a downlink-only slot). For example, the UE 120 may receive, from the network node 110, a dynamic indication (e.g., via a MAC-CE or DCI) of a switch of an SBFD slot to a downlink slot (e.g., releasing the uplink sub-band of the SBFD slot). In some aspects, the dynamic switching of an SBFD slot within the nominal TDW to a downlink slot (e.g., downlink-only slot) may be considered to be an event that breaks phase continuity and/or power consistency for the uplink transmissions in the nominal TDW.

Figure 8D:
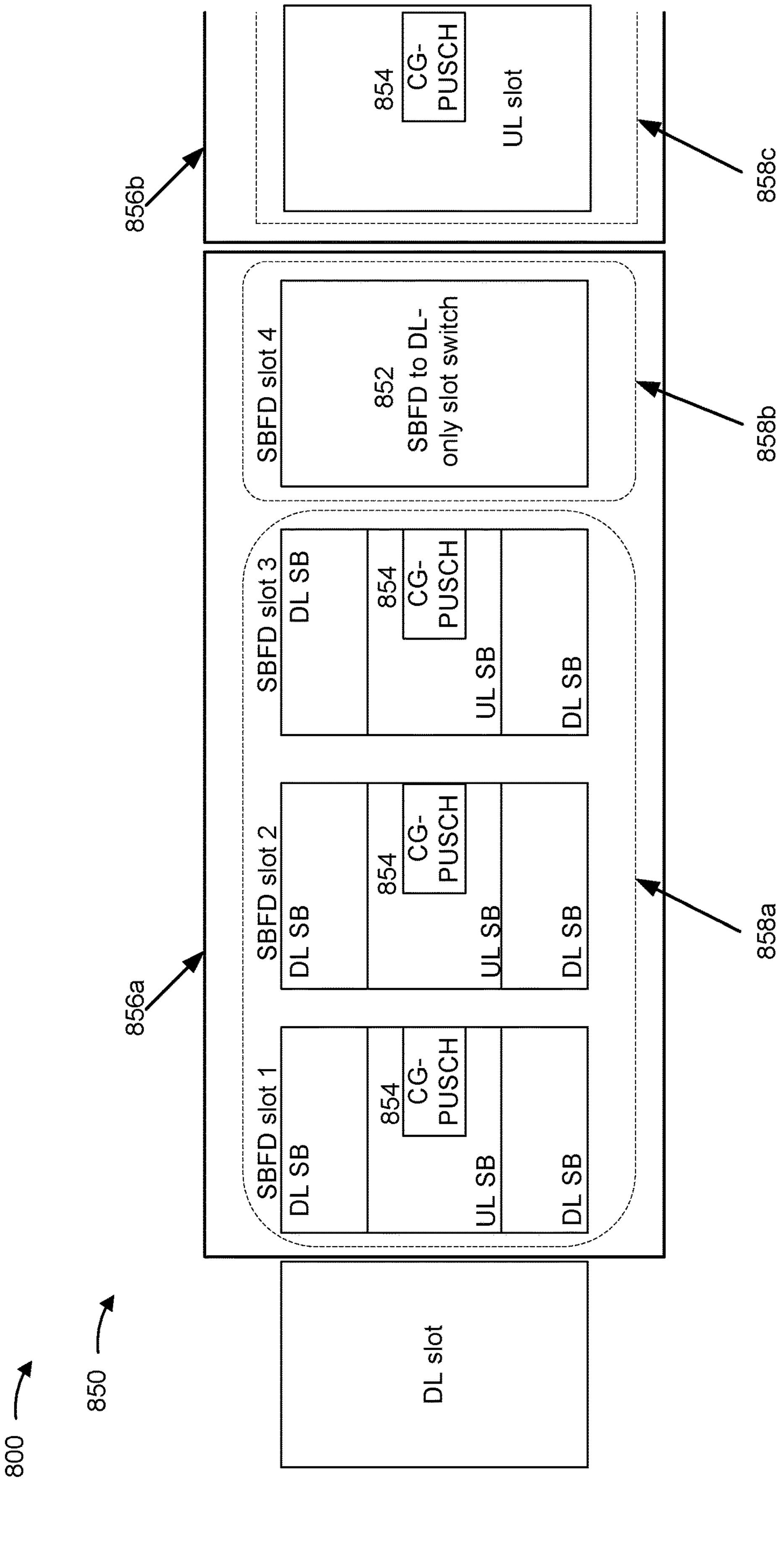

FIG. 8D shows an example 850 of DMRS bundling in a case in which there is a switch of an SBFD slot to a downlink slot. As shown in FIG. 8D, and by reference number 852, an SBFD slot (e.g., originally SBFD slot 4) may switch from an SBFD slot to a downlink-only slot. For example, the UE 120 may receive, from the network node 110, a dynamic indication of the switch of the SBFD slot to the downlink-only slot. As shown by reference number 854, configured grant PUSCH transmission occasions are scheduled in three SBFD slots (shown as SBFD slot 1-SBFD slot 3) and an uplink slot. A configured grant PUSCH transmission occasion can no longer be scheduled in SBFD slot 4 due to the switch to a downlink-only slot. As further shown in FIG. 8D, the UE 120 may determine a nominal TDW 856*a*. The nominal TDW 856*a* may start at SBFD slot 1 and may span the nominal TDW duration of four slots. Accordingly, the nominal TDW 856*a* may include the SBFD slots 1-3 and SBFD slot 4 (which has switched to a downlink-only slot). The switch of SBFD slot 4 to the downlink-only slot may be an event that causes the UE 120 to split the nominal TDW 856*a* into a first actual TDW 858*a* and a second actual TDW 858*b*. As shown in FIG. 8D, the UE 120 may terminate the first actual TDW 858*a* based on the switch of SBFD slot 4 to a downlink-only slot. Accordingly, the first actual TDW 858*a* may include SBFD slot 1-SBFD slot 3. In this example, the second TDW 858*b* may include SBFD slot 4 (which has been switched to a downlink-only slot). Accordingly, in this example, due to the switch of SBFD slot 4 to a downlink-only slot, the second TDW 858*b* does not include any uplink transmissions. The UE 120 may determine another nominal TDW 856*b* starting at the uplink slot, and the UE 120 may start DMRS bundling in an actual TDW 858*c* (e.g., a first actual TDW in the nominal TDW 856*b*) starting at the start of the nominal TDW 856*b*.

Returning to FIG. 8A, as further shown by reference number 820, the network node 110 may receive the uplink transmissions with the DMRS bundling in the multiple actual TDWs within the nominal TDWs. In some aspects, the network node 110 may perform joint channel estimation based on the DMRSs included in the uplink transmissions in each actual TDW.

As indicated above, FIGS. 8A-8D are provided as an example. Other examples may differ from what is described with respect to FIGS. 8A-8D.

Figure 9:
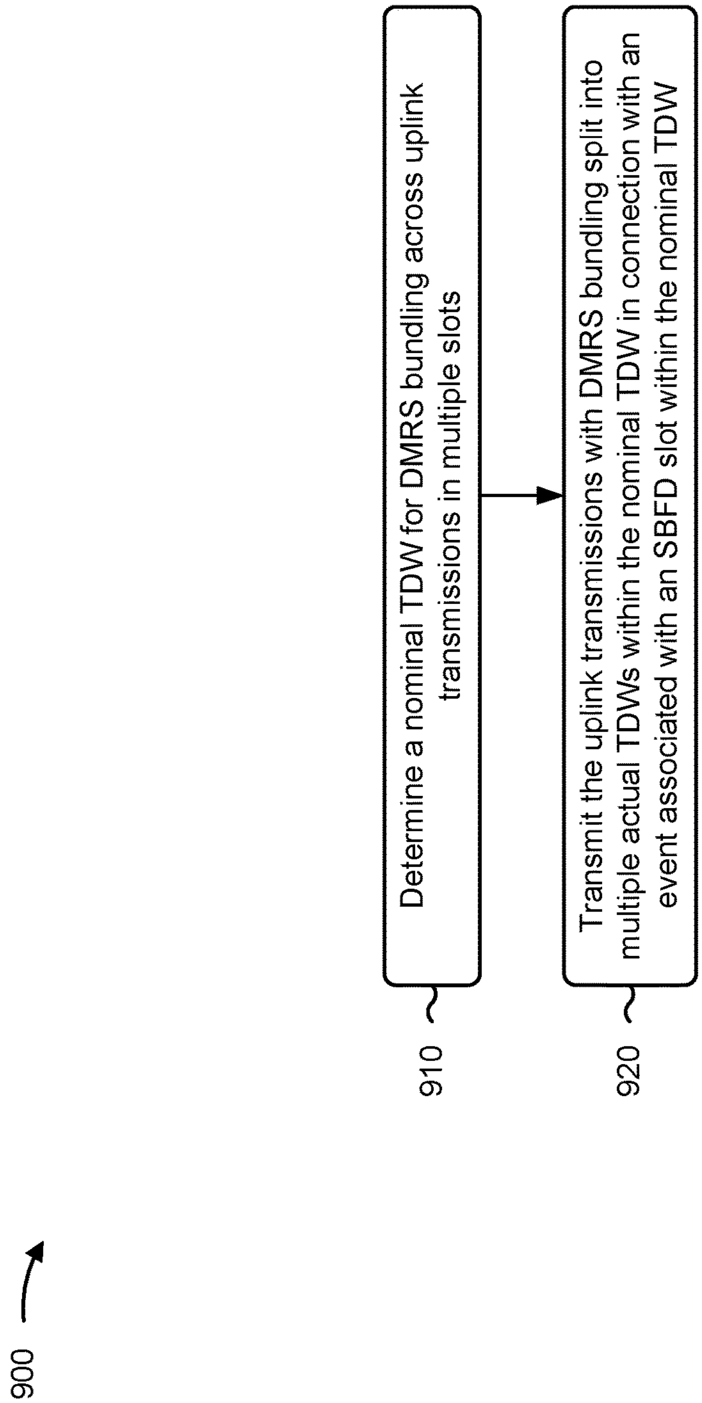
FIG. 9 is a diagram illustrating an example process performed, for example, at a UE or an apparatus of a UE, in accordance with the present disclosure.

FIG. 9 is a diagram illustrating an example process 900 performed, for example, at a UE or an apparatus of a UE, in accordance with the present disclosure. Example process 900 is an example where the apparatus or the UE (e.g., UE 120) performs operations associated with DMRS bundling in SBFD slots.

As shown in FIG. 9, in some aspects, process 900 may include determining a nominal TDW for DMRS bundling across uplink transmissions in multiple slots (block 910). For example, the UE (e.g., using communication manager 1006, depicted in FIG. 10) may determine a nominal TDW for DMRS bundling across uplink transmissions in multiple slots, as described above.

As further shown in FIG. 9, in some aspects, process 900 may include transmitting the uplink transmissions with DMRS bundling split into multiple actual TDWs within the nominal TDW in connection with an event associated with an SBFD slot within the nominal TDW (block 920). For example, the UE (e.g., using transmission component 1004 and/or communication manager 1006, depicted in FIG. 10) may transmit the uplink transmissions with DMRS bundling split into multiple actual TDWs within the nominal TDW in connection with an event associated with an SBFD slot within the nominal TDW, as described above.

Process 900 may include additional aspects, such as any single aspect or any combination of aspects described below and/or in connection with one or more other processes described elsewhere herein.

In a first aspect, transmitting the uplink transmissions with DMRS bundling split into the multiple actual TDWs includes starting DMRS bundling for the uplink transmissions in a first actual TDW starting at a start of the nominal TDW, terminating the first actual TDW in connection with the event associated with the SBFD slot, and re-starting DMRS bundling for the uplink transmissions in a second actual TDW starting at a next slot, after the SBFD slot, within the nominal TDW.

In a second aspect, alone or in combination with the first aspect, process 900 includes splitting the nominal TDW for DMRS bundling into the multiple actual TDWs in connection with detecting the event associated with the SBFD slot.

In a third aspect, alone or in combination with one or more of the first and second aspects, the event associated with the SBFD slot is an event, in the SBFD slot, that breaks at least one of phase continuity or power consistency for the uplink transmissions in the nominal TDW.

In a fourth aspect, alone or in combination with one or more of the first through third aspects, the event associated with the SBFD slot is a collision, in the SBFD slot, between a scheduled uplink transmission and a scheduled downlink reception associated with a higher priority than the scheduled uplink transmission.

In a fifth aspect, alone or in combination with one or more of the first through fourth aspects, the scheduled downlink reception associated with the higher priority than the scheduled uplink transmission includes at least one of a PDCCH monitoring occasion, an SSB, a PDSCH, a CSI-RS, or a TRS.

In a sixth aspect, alone or in combination with one or more of the first through fifth aspects, all PDCCH monitoring occasions, SSBs, and periodic TRSs are associated with the higher priority than the scheduled uplink transmission.

In a seventh aspect, alone or in combination with one or more of the first through sixth aspects, the scheduled downlink reception associated with the higher priority than the scheduled uplink transmission includes at least one of a TRS in a first two symbols in a TRS occasion, a PDCCH monitoring occasion associated with a CORESET0 or a CSS, or an SSB in accordance with an indication, received by the UE, to prioritize SSB reception.

In an eighth aspect, alone or in combination with one or more of the first through seventh aspects, process 900 includes dropping the scheduled uplink transmission in connection with the collision between the scheduled uplink transmission and the scheduled downlink reception associated with higher priority than the scheduled uplink transmission, wherein the multiple actual TDWs include a first actual TDW that ends at the SBFD slot and a second actual TDW that starts at a next slot after the SBFD slot in the nominal TDW.

In a ninth aspect, alone or in combination with one or more of the first through eighth aspects, the scheduled downlink reception associated with the higher priority than the scheduled uplink transmission is a PDCCH monitoring occasion, and process 900 includes determining a subsequent nominal TDW for DMRS bundling, wherein a scheduled uplink transmission, in an SBFD slot within the subsequent nominal TDW, collides with a scheduled PDCCH monitoring occasion, receiving an indication to skip the scheduled PDCCH monitoring occasion, and refraining from splitting the subsequent nominal TDW into multiple actual TDWs in connection with a time offset between the indication and the scheduled uplink transmission in the SBFD slot within the subsequent nominal TDW satisfying a threshold.

In a tenth aspect, alone or in combination with one or more of the first through ninth aspects, the event associated with the SBFD slot is a switch to downlink reception in the SBFD slot within the nominal TDW.

In an eleventh aspect, alone or in combination with one or more of the first through tenth aspects, the event associated with the SBFD slot is a switch of the SBFD slot within the nominal TDW to a downlink slot.

In a twelfth aspect, alone or in combination with one or more of the first through eleventh aspects, process 900 includes receiving a dynamic indication of the switch of the SBFD slot to the downlink slot.

In a thirteenth aspect, alone or in combination with one or more of the first through twelfth aspects, the dynamic indication is included in a MAC-CE or DCI.

In a fourteenth aspect, alone or in combination with one or more of the first through thirteenth aspects, the uplink transmissions include PUSCH transmissions of PUSCH repetition type A scheduled by DCI, PUSCH transmissions of PUSCH repetition type A associated with a configured grant, PUSCH transmissions of PUSCH repetition type B, PUSCH transmissions associated with transport block processing over multiple slots, or PUCCH transmissions of PUCCH repetition.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
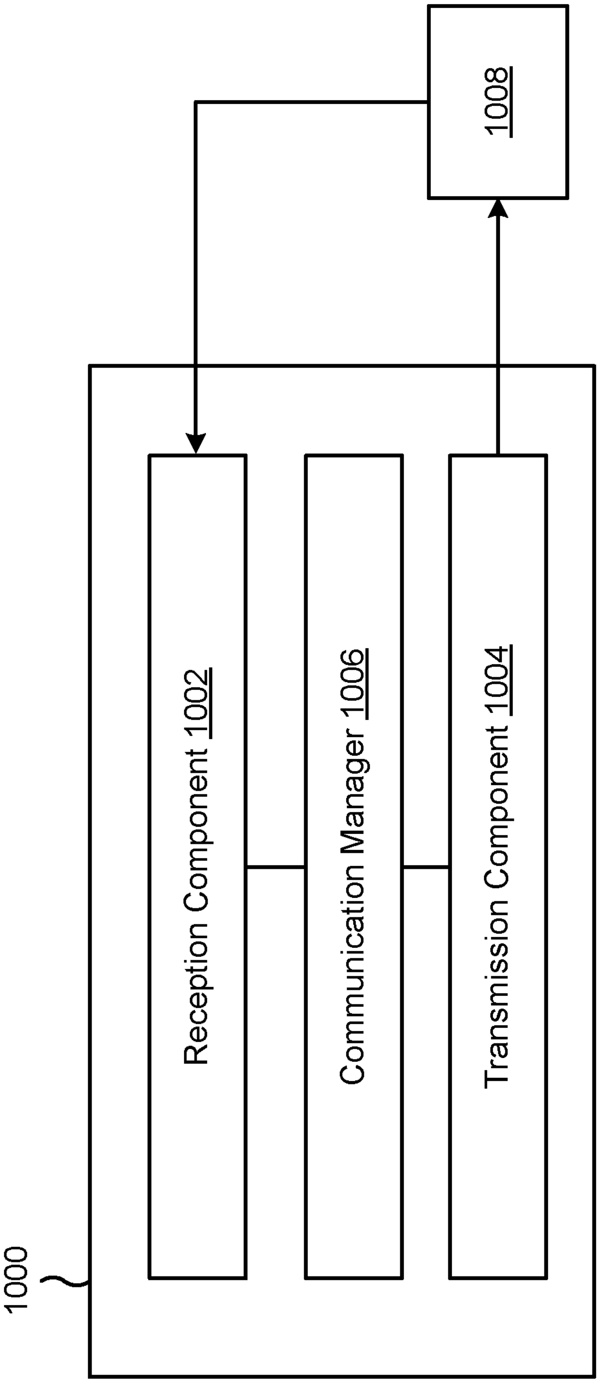
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 140 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIGS. 8A-8D. Additionally, or alternatively, the apparatus 1000 may be configured to perform one or more processes described herein, such as process 900 of FIG. 9, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, one or more modems, one or more demodulators, one or more MIMO detectors, one or more receive processors, one or more controllers/processors, one or more memories, or a combination thereof, of the UE described in connection with FIG. 2.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, one or more modems, one or more modulators, one or more transmit MIMO processors, one or more transmit processors, one or more controllers/processors, one or more memories, or a combination thereof, of the UE described in connection with FIG. 2. In some aspects, the transmission component 1004 may be co-located with the reception component 1002 in one or more transceivers.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The communication manager 1006 may determine a nominal TDW for DMRS bundling across uplink transmissions in multiple slots. The transmission component 1004 may transmit the uplink transmissions with DMRS bundling split into multiple actual TDWs within the nominal TDW in connection with an event associated with an SBFD slot within the nominal TDW.

The communication manager 1006 may split the nominal TDW for DMRS bundling into the multiple actual TDWs in connection with detecting the event associated with the SBFD slot.

The communication manager 1006 may drop the scheduled uplink transmission in connection with the collision between the scheduled uplink transmission and the scheduled downlink reception associated with higher priority than the scheduled uplink transmission, wherein the multiple actual TDWs include a first actual TDW that ends at the SBFD slot and a second actual TDW that starts at a next slot after the SBFD slot in the nominal TDW.

The communication manager 1006 may determine a subsequent nominal TDW for DMRS bundling, wherein a scheduled uplink transmission, in an SBFD slot within the subsequent nominal TDW, collides with a scheduled PDCCH monitoring occasion. The reception component 1002 may receive an indication to skip the scheduled PDCCH monitoring occasion. The communication manager 1006 may refrain from splitting the subsequent nominal TDW into multiple actual TDWs in connection with a time offset between the indication and the scheduled uplink transmission in the SBFD slot within the subsequent nominal TDW satisfying a threshold.

The reception component 1002 may receive a dynamic indication of the switch of the SBFD slot to the downlink slot.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed at a user equipment (UE), comprising: determining a nominal time domain window (TDW) for demodulation reference signal (DMRS) bundling across uplink transmissions in multiple slots; and transmitting the uplink transmissions with DMRS bundling split into multiple actual TDWs within the nominal TDW in connection with an event associated with a sub-band full duplex (SBFD) slot within the nominal TDW.

Aspect 2: The method of Aspect 1, wherein transmitting the uplink transmissions with DMRS bundling split into the multiple actual TDWs comprises: starting DMRS bundling for the uplink transmissions in a first actual TDW starting at a start of the nominal TDW; terminating the first actual TDW in connection with the event associated with the SBFD slot; and re-starting DMRS bundling for the uplink transmissions in a second actual TDW starting at a next slot, after the SBFD slot, within the nominal TDW.

Aspect 3: The method of any of Aspects 1-2, further comprising: splitting the nominal TDW for DMRS bundling into the multiple actual TDWs in connection with detecting the event associated with the SBFD slot.

Aspect 4: The method of any of Aspects 1-3, wherein the event associated with the SBFD slot is an event, in the SBFD slot, that breaks at least one of phase continuity or power consistency for the uplink transmissions in the nominal TDW.

Aspect 5: The method of any of Aspects 1-4, wherein the event associated with the SBFD slot is a collision, in the SBFD slot, between a scheduled uplink transmission and a scheduled downlink reception associated with a higher priority than the scheduled uplink transmission.

Aspect 6: The method of Aspect 5, wherein the scheduled downlink reception associated with the higher priority than the scheduled uplink transmission includes at least one of: a physical downlink control channel (PDCCH) monitoring occasion, a synchronization signal block (SSB), a physical downlink shared channel (PDSCH), a channel state information reference signal (CSI-RS), or a tracking reference signal (TRS).

Aspect 7: The method of Aspect 6, wherein all PDCCH monitoring occasions, SSBs, and periodic TRSs are associated with the higher priority than the scheduled uplink transmission.

Aspect 8: The method of any of Aspects 5-6, wherein the scheduled downlink reception associated with the higher priority than the scheduled uplink transmission includes at least one of: a tracking reference signal (TRS) in a first two symbols in a TRS occasion, a physical downlink control channel (PDCCH) monitoring occasion associated with a control resource set type 0 (CORESET0) or a common search space (CSS), or a synchronization signal block (SSB) in accordance with an indication, received by the UE, to prioritize SSB reception.

Aspect 9: The method of any of Aspects 5-8, further comprising: dropping the scheduled uplink transmission in connection with the collision between the scheduled uplink transmission and the scheduled downlink reception associated with higher priority than the scheduled uplink transmission, wherein the multiple actual TDWs include a first actual TDW that ends at the SBFD slot and a second actual TDW that starts at a next slot after the SBFD slot in the nominal TDW.

Aspect 10: The method of any of Aspects 5-9, wherein the scheduled downlink reception associated with the higher priority than the scheduled uplink transmission is a physical downlink control channel (PDCCH) monitoring occasion, and further comprising: determining a subsequent nominal TDW for DMRS bundling, wherein a scheduled uplink transmission, in an SBFD slot within the subsequent nominal TDW, collides with a scheduled PDCCH monitoring occasion; receiving an indication to skip the scheduled PDCCH monitoring occasion; and refraining from splitting the subsequent nominal TDW into multiple actual TDWs in connection with a time offset between the indication and the scheduled uplink transmission in the SBFD slot within the subsequent nominal TDW satisfying a threshold.

Aspect 11: The method of any of Aspects 1-10, wherein the event associated with the SBFD slot is a switch to downlink reception in the SBFD slot within the nominal TDW.

Aspect 12: The method of any of Aspects 1-11, wherein the event associated with the SBFD slot is a switch of the SBFD slot within the nominal TDW to a downlink slot.

Aspect 13: The method of Aspect 12, further comprising: receiving a dynamic indication of the switch of the SBFD slot to the downlink slot.

Aspect 14: The method of Aspect 13, wherein the dynamic indication is included in a medium access control (MAC) control element (MAC-CE) or downlink control information (DCI).

Aspect 15: The method of any of Aspects 1-14, wherein the uplink transmissions include: physical uplink shared channel (PUSCH) transmissions of PUSCH repetition type A scheduled by downlink control information (DCI), PUSCH transmissions of PUSCH repetition type A associated with a configured grant, PUSCH transmissions of PUSCH repetition type B, PUSCH transmissions associated with transport block processing over multiple slots, or physical uplink control channel (PUCCH) transmissions of PUCCH repetition.

Aspect 16: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-15.

Aspect 17: An apparatus for wireless communication at a device, the apparatus comprising one or more memories and one or more processors coupled to the one or more memories, the one or more processors configured to cause the device to perform the method of one or more of Aspects 1-15.

Aspect 18: An apparatus for wireless communication, the apparatus comprising at least one means for performing the method of one or more of Aspects 1-15.

Aspect 19: A non-transitory computer-readable medium storing code for wireless communication, the code comprising instructions executable by one or more processors to perform the method of one or more of Aspects 1-15.

Aspect 20: A non-transitory computer-readable medium storing a set of instructions for wireless communication, the set of instructions comprising one or more instructions that, when executed by one or more processors of a device, cause the device to perform the method of one or more of Aspects 1-15.

Aspect 21: A device for wireless communication, the device comprising a processing system that includes one or more processors and one or more memories coupled with the one or more processors, the processing system configured to cause the device to perform the method of one or more of Aspects 1-15.

Aspect 22: An apparatus for wireless communication at a device, the apparatus comprising one or more memories and one or more processors coupled to the one or more memories, the one or more processors individually or collectively configured to cause the device to perform the method of one or more of Aspects 1-15.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based on or otherwise in association with" unless explicitly stated otherwise. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. An apparatus for wireless communication at a user equipment (UE), comprising:

one or more memories; and one or more processors coupled to the one or more memories, the one or more processors individually or collectively configured to cause the UE to:

determine a nominal time domain window (TDW) for demodulation reference signal (DMRS) bundling across uplink transmissions in multiple slots;

transmit the uplink transmissions with DMRS bundling split into multiple actual TDWs within the nominal TDW in connection with an event associated with a sub-band full duplex (SBFD) slot within the nominal TDW;

determine a subsequent nominal TDW for DMRS bundling, wherein a scheduled uplink transmission, in an SBFD slot within the subsequent nominal TDW, collides with a scheduled physical downlink control channel (PDCCH) monitoring occasion;

receive an indication to skip the scheduled PDCCH monitoring occasion; and refrain from splitting the subsequent nominal TDW into multiple actual TDWs in connection with a time offset between the indication and the scheduled uplink transmission in the SBFD slot within the subsequent nominal TDW satisfying a threshold.

2. The apparatus of claim 1, wherein the one or more processors, to cause the UE to transmit the uplink transmissions with DMRS bundling split into the multiple actual TDWs, are individually or collectively configured to cause the UE to:

start DMRS bundling for the uplink transmissions in a first actual TDW starting at a start of the nominal TDW;

terminate the first actual TDW in connection with the event associated with the SBFD slot; and re-start DMRS bundling for the uplink transmissions in a second actual TDW starting at a next slot, after the SBFD slot, within the nominal TDW.

3. The apparatus of claim 1, wherein the one or more processors are further individually or collectively configured to cause the UE to:

split the nominal TDW for DMRS bundling into the multiple actual TDWs in connection with detecting the event associated with the SBFD slot.

4. The apparatus of claim 1, wherein the event associated with the SBFD slot is an event, in the SBFD slot, that breaks at least one of phase continuity or power consistency for the uplink transmissions in the nominal TDW.

5. The apparatus of claim 1, wherein the event associated with the SBFD slot is a collision, in the SBFD slot, between a scheduled uplink transmission and a scheduled downlink reception associated with a higher priority than the scheduled uplink transmission.

6. The apparatus of claim 5, wherein the scheduled downlink reception associated with the higher priority than the scheduled uplink transmission includes at least one of:

another PDCCH monitoring occasion, a synchronization signal block (SSB), a physical downlink shared channel (PDSCH), a channel state information reference signal (CSI-RS), or a tracking reference signal (TRS).

7. The apparatus of claim 6, wherein all PDCCH monitoring occasions, SSBs, and periodic TRSs are associated with the higher priority than the scheduled uplink transmission.

8. The apparatus of claim 5, wherein the scheduled downlink reception associated with the higher priority than the scheduled uplink transmission includes at least one of:

a tracking reference signal (TRS) in a first two symbols in a TRS occasion, a PDCCH monitoring occasion associated with a control resource set type 0 (CORESET0) or a common search space (CSS), or a synchronization signal block (SSB) in accordance with an indication, received by the UE, to prioritize SSB reception.

9. The apparatus of claim 5, wherein the one or more processors are further individually or collectively configured to cause the UE to:

drop the scheduled uplink transmission in connection with the collision between the scheduled uplink transmission and the scheduled downlink reception associated with higher priority than the scheduled uplink transmission, wherein the multiple actual TDWs include a first actual TDW that ends at the SBFD slot and a second actual TDW that starts at a next slot after the SBFD slot in the nominal TDW.

10. The apparatus of claim 5, wherein the scheduled downlink reception associated with the higher priority than the scheduled uplink transmission is another PDCCH monitoring occasion.

11. The apparatus of claim 1, wherein the event associated with the SBFD slot is a switch to downlink reception in the SBFD slot within the nominal TDW.

12. The apparatus of claim 1, wherein the event associated with the SBFD slot is a switch of the SBFD slot within the nominal TDW to a downlink slot.

13. The apparatus of claim 12, wherein the one or more processors are further individually or collectively configured to cause the UE to:

receive a dynamic indication of the switch of the SBFD slot to the downlink slot.

14. The apparatus of claim 1, wherein the uplink transmissions include:

physical uplink shared channel (PUSCH) transmissions of PUSCH repetition type A scheduled by downlink control information (DCI), PUSCH transmissions of PUSCH repetition type A associated with a configured grant, PUSCH transmissions of PUSCH repetition type B, PUSCH transmissions associated with transport block processing over multiple slots, or physical uplink control channel (PUCCH) transmissions of PUCCH repetition.

15. A method of wireless communication performed at a user equipment (UE), comprising:

determining a nominal time domain window (TDW) for demodulation reference signal (DMRS) bundling across uplink transmissions in multiple slots;

transmitting the uplink transmissions with DMRS bundling split into multiple actual TDWs within the nominal TDW in connection with an event associated with a sub-band full duplex (SBFD) slot within the nominal TDW;

determining a subsequent nominal TDW for DMRS bundling, wherein a scheduled uplink transmission, in an SBFD slot within the subsequent nominal TDW, collides with a scheduled physical downlink control channel (PDCCH) monitoring occasion;

receiving an indication to skip the scheduled PDCCH monitoring occasion; and refraining from splitting the subsequent nominal TDW into multiple actual TDWs in connection with a time offset between the indication and the scheduled uplink transmission in the SBFD slot within the subsequent nominal TDW satisfying a threshold.

16. The method of claim 15, further comprising:

splitting the nominal TDW for DMRS bundling into the multiple actual TDWs in connection with detecting the event associated with the SBFD slot.

17. The method of claim 15, wherein the event associated with the SBFD slot is a collision, in the SBFD slot, between a scheduled uplink transmission and a scheduled downlink reception associated with a higher priority than the scheduled uplink transmission.

18. The method of claim 15, wherein the event associated with the SBFD slot is a switch to downlink reception in the SBFD slot within the nominal TDW.

19. The method of claim 15, wherein the event associated with the SBFD slot is a switch of the SBFD slot within the nominal TDW to a downlink slot.

20. A non-transitory computer-readable medium storing a set of instructions for wireless communication, the set of instructions comprising:

one or more instructions that, when executed by one or more processors of a user equipment (UE), cause the UE to:

determine a nominal time domain window (TDW) for demodulation reference signal (DMRS) bundling across uplink transmissions in multiple slots;

transmit the uplink transmissions with DMRS bundling split into multiple actual TDWs within the nominal TDW in connection with an event associated with a sub-band full duplex (SBFD) slot within the nominal TDW;

determine a subsequent nominal TDW for DMRS bundling, wherein a scheduled uplink transmission, in an SBFD slot within the subsequent nominal TDW, collides with a scheduled physical downlink control channel (PDCCH) monitoring occasion;

receive an indication to skip the scheduled PDCCH monitoring occasion; and refrain from splitting the subsequent nominal TDW into multiple actual TDWs in connection with a time offset between the indication and the scheduled uplink transmission in the SBFD slot within the subsequent nominal TDW satisfying a threshold.

* * * * *